US012525355B2

(12) United States Patent
Gordon et al.

(10) Patent No.: US 12,525,355 B2
(45) Date of Patent: Jan. 13, 2026

(54) SYSTEMS AND METHODS OF RADIOMICS BASED CANCER STRATIFICATION

(71) Applicant: Tempus AI, Inc., Chicago, IL (US)

(72) Inventors: Jacob William Gordon, West Orange, NJ (US); Nathaniel Braman, Cleveland, OH (US); Jagadish Venkataraman, Menlo Park, CA (US)

(73) Assignee: Tempus AI, Inc., Chicago, IL (US)

( * ) Notice: Subject to any disclaimer, the term of this patent is extended or adjusted under 35 U.S.C. 154(b) by 333 days.

(21) Appl. No.: 18/449,425

(22) Filed: Aug. 14, 2023

(65) Prior Publication Data
US 2025/0062020 A1 Feb. 20, 2025

(51) Int. Cl.
*G06V 10/00* (2022.01)
*G16H 50/20* (2018.01)

(52) U.S. Cl.
CPC .................. *G16H 50/20* (2018.01)

(58) Field of Classification Search
CPC ........ G16H 50/20; G16H 50/50; G16H 50/70; G16H 30/40
See application file for complete search history.

(56) References Cited

U.S. PATENT DOCUMENTS

| | | | | |
|---|---|---|---|---|
| 8,017,747 B2* | 9/2011 | Caldas | ............... | C07K 14/4747 536/23.1 |
| 8,466,147 B2* | 6/2013 | Anderson | ............... | A61K 31/52 514/234.2 |
| 8,828,395 B2* | 9/2014 | Watkins | ................ | C07K 16/40 530/389.1 |
| 9,700,619 B2* | 7/2017 | Hurwitz | ................ | A61P 11/00 |
| 9,714,419 B2* | 7/2017 | Watkins | ................ | C12N 9/93 |

(Continued)

FOREIGN PATENT DOCUMENTS

WO WO 2023/285993 A1 1/2023

OTHER PUBLICATIONS

Ashrafinia, S., "Quantitative Nuclear Medicine Imaging using Advanced Image Reconstruction and Radiomics", Ph.D. Dissertation, Johns Hopkins University, Mar. 2019, pp. 1-293.

(Continued)

*Primary Examiner* — Amir Alavi
(74) *Attorney, Agent, or Firm* — MORGAN, LEWIS & BOCKIUS LLP

(57) ABSTRACT

In the disclosed systems and methods for characterizing a cancer condition of a tissue in a subject, a computer system inputs information into an ensemble model. The information includes, for each respective class of radiomics features in a plurality of classes of radiomics features, a corresponding value for each respective radiomic feature in a corresponding plurality of radiomics features of the respective class of radiomics features obtained from a medical imaging dataset. The ensemble model comprises a plurality of component models. The computer system obtains as output from each respective component model in the plurality of component models a corresponding component prediction for the cancer condition, thereby obtaining a plurality of component predictions for the cancer condition. The computer system combines the plurality of component predictions to obtain as output of the ensemble model a characterization of the cancer condition.

20 Claims, 22 Drawing Sheets

(56) References Cited

U.S. PATENT DOCUMENTS

| | | | |
|---|---|---|---|
| 10,991,097 B2 | 4/2021 | Yip et al. | |
| 11,324,469 B2* | 5/2022 | Jacobs | G06F 18/40 |
| 11,810,292 B2* | 11/2023 | Madabhushi | G06V 10/764 |
| 12,057,234 B2* | 8/2024 | Zhao | G16H 50/30 |
| 12,094,612 B2* | 9/2024 | Zhao | G16H 30/40 |
| 12,106,473 B2* | 10/2024 | Wang | G06N 3/045 |
| 2019/0370965 A1 | 12/2019 | Lay et al. | |
| 2022/0037018 A1* | 2/2022 | Goede | G06F 18/251 |
| 2025/0062020 A1* | 2/2025 | Gordon | G16H 30/40 |

OTHER PUBLICATIONS

Bhoi, N., "Development of Some Novel Spatial-Domain and Transform-Domain Digital Image Filters," Doctoral dissertation, Jan. 2009, pp. 1-254.

Chaddad, A., et al. "Predicting survival time of lung cancer patients using radiomic analysis", Oncotarget, 2017, vol. 8, No. 61, https://www.oncotarget.com/article/22251/text/, pp. 104393-104407.

Cheng et al., 2003, "Computer-aided detection and classification of microcalcifications in mammograms: a survey," Pattern Recognition, 36(12), p. 2967-2991.

Davatzikos, C., et al., "Cancer Imaging Phenomics Toolkit: Quantitative Imaging Analytics for Precision Diagnostics and Predictive Modeling of Clinical Outcome," J. Med. Imaging, 5(1), 2018, pp. 011018.

Ferl, G.Z., et al., "Automated segmentation of lungs and lung tumors in mouse micro-CT scans," iScience, 25(12):105712 (2022), pp. 1-15.

Gore, S., et al., "Local Binary and Ternary Patterns Based Quantitative Texture Analysis for Assessment of IDH Genotype in Gliomas on Multi-modal MRI", https://link.springer.com/chapter/10.1007/978-3-030-66843-3_23, Springer, 2020, pp. 240-248.

Legendre et al., (2018) "Package 'lmodel2'," print, available at cran.r-project.org/web/packages/lmodel2/lmodel2.pdf (accessed Jul. 12, 2023), pp. 1-6.

Mayerhoefer, M. E., et al., 2020, "Introduction to Radiomics," Journal of Nuclear Medicine, 61(4), pp. 488-495.

Pati S., et al., "The Cancer Imaging Phenomics Toolkit (CaPTk): Technical Overview," Springer—BrainLes 2019—LNCS, 11993, 2020, pp. 380-394.

Singh, P., "Feature enhanced Speckle Reduction in Ultrasound Images: Algorithms for Scan Modelling, Speckle Filtering, Texture Analysis and Feature Improvement," Doctoral dissertation, Aug. 21, 2019, pp. 1-136.

Traverso, A., et al., 2018, "Repeatability and Reproducibility of Radiomic Features: A Systematic Review," International Journal of Radiation Oncology* Biology* Physics, 102(4), pp. 1143-1158.

Van Griethuysen, J., et al., "Computational Radiomics System to Decode the Radiographic Phenotype," Cancer Research, 77(21), (2017), pp. 1-4.

Van Timmeren, J., et al., "Radiomics in medical imaging—"how-to" guide and critical reflection," Insights Imaging, 11:91 (2020), pp. 1-16.

Zwanenburg, A., et al., "The Image Biomarker Standardization Initiative: Standardized Quantitative Radiomics for High-Throughput Image-based Phenotyping," Radiology, vol. 295, No. 2, May 2020, pp. 328-338.

Pyradiomics Community, "Radiomic Features," available at pyradiomics.readthedocs.io/en/latest/features.html# (accessed Jul. 12, 2023), pp. 1-23.

University of Pennsylvania, Center for Biomedical Image Computing & Analytics, "Cancer Imaging Phenomics Toolkit: Further Application Details and Assumptions," available at cbica.github.io/CaPTk/tr_Apps.html#appsFeatures (accessed Jul. 12, 2023), pp. 1-4.

Standardized Environment for Radiomics Analysis (SERA), 2019, "SERA Feature Names and Benchmarks," available at github.com/ashrafinia/SERA/tree/master/Feature%20Names%20and%20Benchmarks (accessed Jul. 12, 2023).

* cited by examiner 100 (cont'd)

Radiomics data 52 corresponding to a respective medical imaging dataset

| Radiomics Features Class 1 62-1 |
| --- |
| Radiomics Feature 1-1 64-1-1 |
| Value 66-1-1 |
| Radiomics Feature 1-M 64-1-M |
| Value 66-1-M |
| ⋮ |
| Radiomics Features Class Q 62-Q |
| Radiomics Feature Q-1 64-Q-1 |
| Value 66-Q-1 |
| Radiomics Feature Q-X 64-Q-X |
| Value 66-Q-X |

FIG. 1B

*(200)* A method for characterizing a cancer condition of a tissue in a subject.

*(202)* Prior to inputting information into an ensemble model, extract, for each respective class of radiomics features in a first subset of classes of radiomics features, a corresponding value for each respective radiomic feature in the respective class of radiomics features in the first subset of classes of radiomics features from a region of interest (ROI) or a volume of interest (VOI) in an unfiltered version of a plurality of medical images of a tissue in a subject acquired at a first time using a first medical imaging modality.

*(204)* Identify the ROI or the VOI in the plurality of medical images.

*(206)* Segment the unfiltered version of the plurality of medical images into a plurality of segments or a plurality of volumes.

*(208)* Assign, to each respective segment in the plurality of segments or to each respective volume in the plurality of volumes, a respective tissue classification in a plurality of tissue classifications based on one or more features of the respective segment or respective volume.

*(210)* Group respective segments in the plurality of segments or respective volumes in the plurality of volumes assigned a target tissue classification in the plurality of tissue classifications, thereby identifying the ROI or the VOI.

*(211)* Extract, for each respective class of radiomics features in a second subset of classes of radiomics features, a corresponding value for each respective radiomic feature in the respective class of radiomics features in the second subset of classes of radiomics features from an ROI or a VOI in a filtered version of the plurality of medical images.

FIG. 2A

(212) Input information into an ensemble model comprising a plurality of component models to obtain as output from each respective component model in the plurality of component models a corresponding component prediction for the cancer condition, thereby obtaining a plurality of component predictions for the cancer condition. The information comprises, for each respective class of radiomics features in a plurality of classes of radiomics features, a corresponding value for each respective radiomic feature in a corresponding plurality of radiomics features of the respective class of radiomics features obtained from a medical imaging dataset, where the medical imaging dataset comprises the plurality of medical images of the tissue in the subject acquired at the first time using the first medical imaging modality. The ensemble model comprises a plurality of parameters. The inputting includes (i) inputting the corresponding value for each respective radiomics feature in the corresponding plurality of radiomics features of a first respective class of radiomics features in the plurality of classes of radiomics features into a first respective component model in the plurality of component models and (ii) inputting the corresponding value for each respective radiomics feature in the corresponding plurality of radiomics features of a second respective class of radiomics features in the plurality of classes of radiomics features into a second respective component model in the plurality of component models. The corresponding value for no respective radiomics feature in the corresponding plurality of radiomics features of the first respective class of radiomics features is input into the second component model and the corresponding value for no respective radiomics feature in the corresponding plurality of radiomics features of the second respective class of radiomics features is input into the first respective component model.

(214) The plurality of parameters comprises at least 10,000 parameters.

FIG. 2B

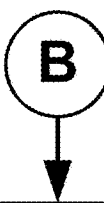

*(212 continued)*

*(216)* The cancer condition is a cancer selected from the group consisting of a carcinoma, lymphoma, blastoma, glioblastoma, sarcoma, leukemia, breast cancer, squamous cell cancer, lung cancer, small-cell lung cancer, non-small cell lung cancer (NSCLC), adenocarcinoma of the lung, squamous carcinoma of the lung, head and neck cancer, cancer of the peritoneum, hepatocellular cancer, gastric or stomach cancer, pancreatic cancer, ovarian cancer, cervical cancer, liver cancer, bladder cancer, hepatoma, colon cancer, colorectal cancer, endometrial or uterine carcinoma, salivary gland carcinoma, kidney or renal cancer, liver cancer, prostate cancer, vulval cancer, thyroid cancer, hepatic carcinoma, B-cell lymphoma, low grade/follicular non-Hodgkin's lymphoma (NHL), small lymphocytic (SL) NHL, intermediate grade/follicular NHL, intermediate grade diffuse NHL, high grade immunoblastic NHL, high grade lymphoblastic NHL, high grade small non-cleaved cell NHL, bulky disease NHL, mantle cell lymphoma, AIDS-related lymphoma, Waldenstrom's Macroglobulinemia, chronic lymphocytic leukemia (CLL), acute lymphoblastic leukemia (ALL), hairy cell leukemia, and chronic myeloblastic leukemia.

*(218)* The plurality of component models is at least 10 component models.

*(220)* The plurality of component models is at least 20 component models.

*(222)* The plurality of component models is at least 40 component models.

*(224)* The plurality of component models is no more than 250 component models.

*(226)* The plurality of component models is no more than 100 component models.

FIG. 2C

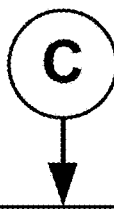

(212 continued)

*(228)* The plurality of component models is no more than 50 component models.

*(230)* The plurality of component models is from 5 to 100 component models.

*(232)* The plurality of component models is from 10 to 75 component models.

*(234)* The plurality of component models from 20 to 50 component models.

*(236)* A respective component model in the plurality of component models is a neural network, a support vector machine, a Naive Bayes model, a nearest neighbor model, a boosted trees model, a random forests model, or a clustering model.

*(238)* Each respective component model in the plurality of component models comprises a respective neural network.

*(240)* Each respective component model in the plurality of component models comprises a respective logistic regression model.

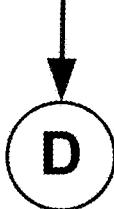

FIG. 2D

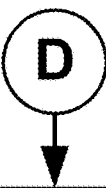

*(212 continued)*

*(242)* The plurality of classes of radiomics features comprises the first subset of classes of radiomics features extracted from the unfiltered version of the plurality of medical images in the medical imaging dataset and the second subset of classes of radiomics features extracted from the filtered version of the plurality of medical images in the medical imaging dataset filtered by a first filtering methodology.

*(244)* The first filtering methodology comprises an imaging filter selected from the group consisting of a wavelet transform filter, a Laplacian of Gaussian (LoG) filter, a square transform filter, a square root transform filter, a logarithm transform filter, an exponential transform filter, a gradient transform filter, a 2-dimensional local binary pattern filter, and a 3-dimensional local binary pattern filter.

*(246)* The first subset of classes of radiomics features comprises at least 3, at least 4, or at least 5 classes of radiomics features.

*(248)* The first subset of classes of radiomics features comprises a class of radiomics features selected from the group consisting of shape features, first order features, gray level cooccurrence matrix (GLCM) features, gray level run length matrix (GLRLM) features, gray level size zone matrix (GLSZM), gray level dependence matrix (GLDM) features, and neighboring gray tone difference matrix (NGTDM) features.

*(250)* The first subset of classes of radiomics features comprises shape features, first order features, gray level cooccurrence matrix (GLCM) features, gray level run length matrix (GLRLM) features, gray level size zone matrix (GLSZM), and gray level dependence matrix (GLDM) features.

*(252)* Each respective class of radiomics features in the first subset of classes of radiomics features comprises at least 10, at least 25, at least 50, at least 100, or at least 250 corresponding radiomics features.

*(254)* Each respective class of radiomics features in the first subset of classes of radiomics features comprises no more than 1000, no more than 750, no more than 500, no more than 250, or no more than 100 corresponding radiomics features.

FIG. 2E

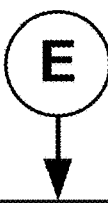

(212 continued)

*(256)* The plurality of classes of radiomics features comprises a subset of classes of radiomics features extracted from a version of the plurality of medical images filtered using a first wavelet transform filter.

*(258)* The subset of classes of radiomics features extracted from the version of the plurality of medical images filtered using the first wavelet transform filter comprises at least 3, at least 4, or at least 5 classes of radiomics features.

*(260)* The subset of classes of radiomics features extracted from the version of the plurality of medical images filtered using the first wavelet transform filter comprises a class of radiomics features selected from the group consisting of first order features, gray level cooccurrence matrix (GLCM) features, gray level run length matrix (GLRLM) features, gray level size zone matrix (GLSZM), gray level dependence matrix (GLDM) features, and neighboring gray tone difference matrix (NGTDM) features.

*(262)* The subset of classes of radiomics features extracted from the version of the plurality of medical images filtered using the first wavelet transform filter comprises first order features, gray level cooccurrence matrix (GLCM) features, gray level run length matrix (GLRLM) features, gray level size zone matrix (GLSZM), and gray level dependence matrix (GLDM) features.

*(264)* Each respective class of radiomics features in the subset of classes of radiomics features extracted from the version of the plurality of medical images filtered using the first wavelet transform filter comprises at least 10, at least 25, at least 50, at least 100, or at least 250 corresponding radiomics features.

*(266)* Each respective class of radiomics features in the subset of classes of radiomics features extracted from the version of the plurality of medical images filtered using the first wavelet transform filter comprises no more than 1000, no more than 750, no more than 500, no more than 250, or no more than 100 corresponding radiomics features.

FIG. 2F

(212 continued)

(268) The plurality of classes of radiomics features comprises a subset of classes of radiomics features extracted from a version of the plurality of medical images filtered using a second wavelet transform filter.

(270) The subset of classes of radiomics features extracted from the version of the plurality of medical images filtered using the second wavelet transform filter comprises at least 3, at least 4, or at least 5 classes of radiomics features.

(272) The subset of classes of radiomics features extracted from the version of the plurality of medical images filtered using the second wavelet transform filter comprises a class of radiomics features selected from the group consisting of first order features, gray level cooccurrence matrix (GLCM) features, gray level run length matrix (GLRLM) features, gray level size zone matrix (GLSZM), gray level dependence matrix (GLDM) features, and neighboring gray tone difference matrix (NGTDM) features.

(274) The subset of classes of radiomics features extracted from the version of the plurality of medical images filtered using the second wavelet transform filter comprises first order features, gray level cooccurrence matrix (GLCM) features, gray level run length matrix (GLRLM) features, gray level size zone matrix (GLSZM), and gray level dependence matrix (GLDM) features.

(276) Each respective class of radiomics features in the subset of classes of radiomics features extracted from the version of the plurality of medical images filtered using the second wavelet transform filter comprises at least 10, at least 25, at least 50, at least 100, or at least 250 corresponding radiomics features.

(278) Each respective class of radiomics features in the subset of classes of radiomics features extracted from the version of the plurality of medical images filtered using the second wavelet transform filter comprises no more than 1000, no more than 750, no more than 500, no more than 250, or no more than 100 corresponding radiomics features.

FIG. 2G

(212 continued)

(280) The plurality of classes of radiomics features comprises a subset of classes of radiomics features extracted from a version of the plurality of medical images filtered using a LoG filter.

(282) The subset of classes of radiomics features extracted from the version of the plurality of medical images filtered using the LoG filter comprises at least 3, at least 4, or at least 5 classes of radiomics features.

(284) The subset of classes of radiomics features extracted from the version of the plurality of medical images filtered using the LoG filter comprises a class of radiomics features selected from the group consisting of first order features, gray level cooccurrence matrix (GLCM) features, gray level run length matrix (GLRLM) features, gray level size zone matrix (GLSZM), gray level dependence matrix (GLDM) features, and neighboring gray tone difference matrix (NGTDM) features.

(286) The subset of classes of radiomics features extracted from the version of the plurality of medical images filtered using the LoG filter comprises first order features, gray level cooccurrence matrix (GLCM) features, gray level run length matrix (GLRLM) features, gray level size zone matrix (GLSZM), and gray level dependence matrix (GLDM) features.

(288) Each respective class of radiomics features in the subset of classes of radiomics features extracted from the version of the plurality of medical images filtered using the LoG filter comprises at least 10, at least 25, at least 50, at least 100, or at least 250 corresponding radiomics features.

(290) Each respective class of radiomics features in the subset of classes of radiomics features extracted from the version of the plurality of medical images filtered using the LoG filter comprises no more than 1000, no more than 750, no more than 500, no more than 250, or no more than 100 corresponding radiomics features.

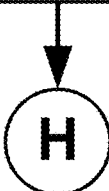

FIG. 2H

*(212 continued)*

*(292)* The plurality of classes of radiomics features comprises a subset of classes of radiomics features extracted from a version of the plurality of medical images filtered using a logarithm transform filter.

*(294)* The subset of classes of radiomics features extracted from the version of the plurality of medical images filtered using the logarithm transform filter comprises at least 3, at least 4, or at least 5 classes of radiomics features.

*(296)* The subset of classes of radiomics features extracted from the version of the plurality of medical images filtered using the logarithm transform filter comprises a class of radiomics features selected from the group consisting of first order features, gray level cooccurrence matrix (GLCM) features, gray level run length matrix (GLRLM) features, gray level size zone matrix (GLSZM), gray level dependence matrix (GLDM) features, and neighboring gray tone difference matrix (NGTDM) features.

*(298)* The subset of classes of radiomics features extracted from the version of the plurality of medical images filtered using the logarithm transform filter comprises first order features, gray level cooccurrence matrix (GLCM) features, gray level run length matrix (GLRLM) features, gray level size zone matrix (GLSZM), and gray level dependence matrix (GLDM) features.

*(2100)* Each respective class of radiomics features in the subset of classes of radiomics features extracted from the version of the plurality of medical images filtered using the logarithm transform filter comprises at least 10, at least 25, at least 50, at least 100, or at least 250 corresponding radiomics features.

*(2102)* Each respective class of radiomics features in the subset of classes of radiomics features extracted from the version of the plurality of medical images filtered using the logarithm transform filter comprises no more than 1000, no more than 750, no more than 500, no more than 250, or no more than 100 corresponding radiomics features.

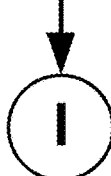

FIG. 2I

(212 continued)

*(2104)* The plurality of classes of radiomics features comprises a subset of classes of radiomics features extracted from a version of the plurality of medical images filtered using a exponential transform filter.

*(2106)* The subset of classes of radiomics features extracted from the version of the plurality of medical images filtered using the exponential transform filter comprises at least 3, at least 4, or at least 5 classes of radiomics features.

*(2108)* The subset of classes of radiomics features extracted from the version of the plurality of medical images filtered using the exponential transform filter comprises a class of radiomics features selected from the group consisting of first order features, gray level cooccurrence matrix (GLCM) features, gray level run length matrix (GLRLM) features, gray level size zone matrix (GLSZM), gray level dependence matrix (GLDM) features, and neighboring gray tone difference matrix (NGTDM) features.

*(2110)* The subset of classes of radiomics features extracted from the version of the plurality of medical images filtered using the exponential transform filter comprises first order features, gray level cooccurrence matrix (GLCM) features, gray level run length matrix (GLRLM) features, gray level size zone matrix (GLSZM), and gray level dependence matrix (GLDM) features.

*(2112)* Each respective class of radiomics features in the subset of classes of radiomics features extracted from the version of the plurality of medical images filtered using the exponential transform filter comprises at least 10, at least 25, at least 50, at least 100, or at least 250 corresponding radiomics features.

*(2114)* Each respective class of radiomics features in the subset of classes of radiomics features extracted from the version of the plurality of medical images filtered using the exponential transform filter comprises no more than 1000, no more than 750, no more than 500, no more than 250, or no more than 100 corresponding radiomics features.

FIG. 2J

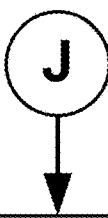

(212 continued)

(2116) The plurality of classes of radiomics features comprises a subset of classes of radiomics features extracted from a version of the plurality of medical images filtered using a square transform filter.

(2118) The subset of classes of radiomics features extracted from the version of the plurality of medical images filtered using the square transform filter comprises at least 3, at least 4, or at least 5 classes of radiomics features.

(2120) The subset of classes of radiomics features extracted from the version of the plurality of medical images filtered using the square transform filter comprises a class of radiomics features selected from the group consisting of first order features, gray level cooccurrence matrix (GLCM) features, gray level run length matrix (GLRLM) features, gray level size zone matrix (GLSZM), gray level dependence matrix (GLDM) features, and neighboring gray tone difference matrix (NGTDM) features.

(2122) The subset of classes of radiomics features extracted from the version of the plurality of medical images filtered using the square transform filter comprises first order features, gray level cooccurrence matrix (GLCM) features, gray level run length matrix (GLRLM) features, gray level size zone matrix (GLSZM), and gray level dependence matrix (GLDM) features.

(2124) Each respective class of radiomics features in the subset of classes of radiomics features extracted from the version of the plurality of medical images filtered using the square transform filter comprises at least 10, at least 25, at least 50, at least 100, or at least 250 corresponding radiomics features.

(2126) Each respective class of radiomics features in the subset of classes of radiomics features extracted from the version of the plurality of medical images filtered using the square transform filter comprises no more than 1000, no more than 750, no more than 500, no more than 250, or no more than 100 corresponding radiomics features.

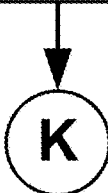

FIG. 2K

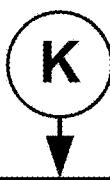

(212 continued)

*(2128)* The plurality of classes of radiomics features comprises a class of local binary pattern (LBP) features.

*(2130)* The plurality of classes of radiomics features comprises a class of local ternary pattern (LTP) features.

*(2132)* The plurality of classes of radiomics features comprises a class of upper LTP features.

*(2134)* The plurality of classes of radiomics features comprises a class of lower LTP features.

*(2136)* The plurality of classes of radiomics features comprises a class of latent features.

*(2138)* Respective latent features in the class of latent features are extracted from a segmentation model.

*(2140)* The medical imaging dataset comprises a computerized tomography (CT) dataset, a magnetic resonance imaging (MRI) dataset, an ultrasound dataset, a position emission tomography (PET) dataset, or an X-ray dataset.

*(2142)* The medical imaging dataset comprises a brain MRI dataset.

*(2144)* The medical imaging dataset comprises a whole-body PET dataset.

*(2146)* The medical imaging dataset comprises a lung CT.

FIG. 2L

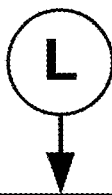

*(2148)* Combine the plurality of component predictions to obtain as output of the ensemble model a characterization of the cancer condition.

*(2150)* The characterization of the cancer condition comprises: a respective cancer type selected from a plurality of cancer types, a respective cancer stage selected from a plurality of cancer stages, a respective tissue of origin selected from a plurality of tissues of origin, a respective cancer grade selected from a plurality of cancer grades, or a respective prognosis selected from a plurality of prognoses.

*(2152)* The characterization of the cancer condition comprises a respective tissue of origin selected from a plurality of tissues of origin.

*(2154)* The characterization of the cancer condition comprises a respective cancer grade selected from a plurality of cancer grades.

*(2156)* The characterization of the cancer condition comprises a respective cancer stage selected from a plurality of cancer stages.

*(2158)* The characterization of the cancer condition comprises a prognosis for the cancer condition selected from a plurality of prognoses.

*(2160)* The plurality of prognoses comprises a continuous range of prognoses.

*(2162)* The prognosis is a predicted survival time.

*(2164)* The predicted survival time is a cancer survival time, a disease-free survival time, or a progression-free survival time.

*(2166)* The predicted survival time is a cancer survival time for non-small cell lung cancer (NSCLC).

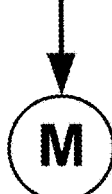

FIG. 2M

(2148 continued)

(2168) The characterization of the cancer condition is a respective characterization selected from a plurality of discrete characterizations of the cancer condition. Each respective component prediction in the plurality of component predictions is a respective component characterization of the cancer condition selected from the plurality of discrete characterizations of the cancer condition. The combining comprises identifying the respective component characterization that is most represented in the plurality of component predictions, thereby obtaining the characterization of the cancer condition.

(2170) The characterization of the cancer condition is a respective characterization identified from a continuous range of characterizations of the cancer condition. Each respective component prediction in the plurality of component predictions is a respective component characterization of the cancer condition identified from the continuous range of characterizations. The combining comprises determining a measure of central tendency for the plurality of component predictions, thereby obtaining the characterization of the cancer condition.

(2172) The measure of central tendency for the plurality of component predictions is a weighted measure of central tendency.

(2174) The combining comprises inputting the plurality of component predictions for the cancer condition into an aggregation model to obtain as output of the aggregation model the characterization of the cancer condition.

(2176) The aggregation model is a neural network, a support vector machine, a Naive Bayes model, a nearest neighbor model, a boosted trees model, a random forests model, or a clustering model.

(2178) The aggregation model is a voting model with a tuned threshold.

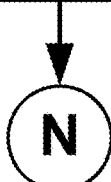

FIG. 2N

(2180) Assign therapy to the subject for the cancer condition based on the characterization of the cancer condition.

(2182) The cancer condition is non-small cell lung cancer (NSCLC). The therapy assigned to the subject is selected from the group consisting of surgery, radiation therapy, and immunotherapy.

(2184) Administer therapy to the subject for the cancer condition based on the characterization of the cancer condition.

(2186) The cancer condition is non-small cell lung cancer (NSCLC). The therapy assigned or administered to the subject is selected from the group consisting of surgery, radiation therapy, and immunotherapy.

FIG. 20

SYSTEMS AND METHODS OF RADIOMICS BASED CANCER STRATIFICATION

TECHNICAL FIELD

This application is directed to using radiomics features to categorize a cancer condition in a subject.

BACKGROUND

Radiomics refers to a quantitative approach to medical imaging whereby a large number of features, termed radiomics features, are extracted from electronic medical imaging data using data characterization algorithms. A model is used to infer the output based on the input radiomics features. The underlying rationale for the use of radiomics is the assumption that electronic medical imaging data contain information beyond visual perception that better reflect tissue properties and may improve diagnostic or prognostic accuracy. To-date, radiomics has been applied to identify and quantify tumor types, assess the risk of various types of cancer, and predict survival time of cancer patients.

Although radiomics has shown promise in predicting response to therapy and overall prognosis, several questions remain. For example, radiomics models are typically trained using many (e.g., thousands) features. While the predictive power of a single radiomics feature is low and increases when a group of features are used, it is unclear how many features are needed to learn or form a "critical mass." Furthermore, some features (or groups of features) may be more crucial than others depending on the characterization task. For example, a group of features may be more important for predicting a cancer type whereas another group of features may be more important for predicting patient survival time.

SUMMARY

As evident from the description above, there remains a need in the art for improved methods and systems for for characterizing cancer conditions using radiomics at appropriate scale. The methods and systems described herein satisfy these and other needs by providing a method and system that utilizes individually weak radiomics features across many classes of radiomics features, to create a competitive radiomics model for stratifying cancer patients based on characteristics of their cancer conditions.

According to some embodiments disclosed herein, a radiomics model comprises an ensemble model that includes a plurality of component models. A respective component model obtains, as input, values of radiomics features in a respective class of radiomics features and outputs a respective prediction component for a cancer condition, thereby obtaining a plurality of component predictions for the cancer condition from the plurality of component models. The ensemble model combines the plurality of component predictions to obtain, as output of the ensemble model, a characterization of the cancer condition. The goal of the ensemble model in this instance is not necessarily to create a combined, better model. Very frequently, with radiomics models, generalizing to new data is a challenge. This is particularly true when training models with larger input feature sets. The ensemble model disclosed herein has the technical advantage of keeping training feature sets small, which helps to reduce over-training. Additionally, because an individual component model tends to overlap with and is correlated with other component models, combining the component predictions from these component models offers a single predetermined model for characterizing the cancer condition. This allows the individual models to maintain most of the predictive power while being more robust and generalizable. The output of the ensemble model can also be integrated with clinical information, thereby providing valuable and complementary information for personalized therapy.

The systems, methods, and devices of this disclosure each have several innovative aspects, no single one of which is solely responsible for the desirable attributes disclosed herein.

According to one aspect of the present disclosure, a method for characterizing a cancer condition of a tissue in a subject is provided. the method includes inputting information into an ensemble model comprising a plurality of component models to obtain as output from each respective component model in the plurality of component models a corresponding component prediction for the cancer condition, thereby obtaining a plurality of component predictions for the cancer condition. The information comprises, for each respective class of radiomics features in a plurality of classes of radiomics features, a corresponding value for each respective radiomic feature in a corresponding plurality of radiomics features of the respective class of radiomics features obtained from a medical imaging dataset. The medical imaging dataset comprises a plurality of medical images of the tissue in the subject acquired at a first time using a first medical imaging modality. In some embodiments, the plurality of medical images collectively provides a three-dimensional image of tissue. The ensemble model comprises a plurality of parameters. The inputting includes (i) inputting the corresponding value for each respective radiomics feature in the corresponding plurality of radiomics features of a first respective class of radiomics features in the plurality of classes of radiomics features into a first respective component model in the plurality of component models and (ii) inputting the corresponding value for each respective radiomics feature in the corresponding plurality of radiomics features of a second respective class of radiomics features in the plurality of classes of radiomics features into a second respective component model in the plurality of component models. The corresponding value for no respective radiomics feature in the corresponding plurality of radiomics features of the first respective class of radiomics features is input into the second component model and the corresponding value for no respective radiomics feature in the corresponding plurality of radiomics features of the second respective class of radiomics features is input into the first respective component model. The method includes combining the plurality of component predictions to obtain as output of the ensemble model a characterization of the cancer condition.

In some embodiments, the characterization of the cancer condition comprises: a respective cancer type selected from a plurality of cancer types, a respective cancer stage selected from a plurality of cancer stages, a respective tissue of origin selected from a plurality of tissues of origin, a respective cancer grade selected from a plurality of cancer grades, or a respective prognosis selected from a plurality of prognoses.

In some embodiments, the plurality of classes of radiomics features includes a first subset of classes of radiomics features extracted from an unfiltered version of the plurality of medical images in the medical imaging dataset and a second subset of classes of radiomics features extracted from a filtered version of the plurality of medical images in the medical imaging dataset filtered by a first filtering methodology.

In some embodiments, the first filtering methodology comprises an imaging filter selected from the group consisting of a wavelet transform filter, a Laplacian of Gaussian (LoG) filter, a square transform filter, a square root transform filter, a logarithm transform filter, an exponential transform filter, a gradient transform filter, a 2-dimensional local binary pattern filter, and a 3-dimensional local binary pattern filter.

Another aspect of the present disclosure provides a computer system for characterizing a cancer condition of a tissue in a subject. The computer system comprises one or more processors and memory addressable by the one or more processors. The memory stores one or more programs configured to be executed by the one or more processors. The one or more programs singularly or collectively comprise instructions for performing any of the methods described herein.

Another aspect of the present disclosure provides a non-transitory computer readable storage medium. The non-transitory computer readable storage medium stores instructions that, when executed by a computer system, cause the computer system to perform any of the methods described herein.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

In the drawings, embodiments of the systems and method of the present disclosure are illustrated by way of example. It is to be expressly understood that the description and drawings are only for the purpose of illustration and as an aid to understanding, and are not intended as a definition of the limits of the systems and methods of the present disclosure.

FIGS. 1A and 1B illustrate a computer system in accordance with some embodiments of the present disclosure.

FIGS. 2A, 2B, 2C, 2D, 2E, 2F, 2G, 2H, 2I, 2J, 2K, 2L, 2M, 2N and 2O collectively provide a flowchart of processes and features for categorizing a cancer condition of a tissue in a subject, in accordance with some embodiments of the present disclosure.

Like reference numerals refer to corresponding parts throughout the several views of the drawings.

DETAILED DESCRIPTION

Figure 1A:
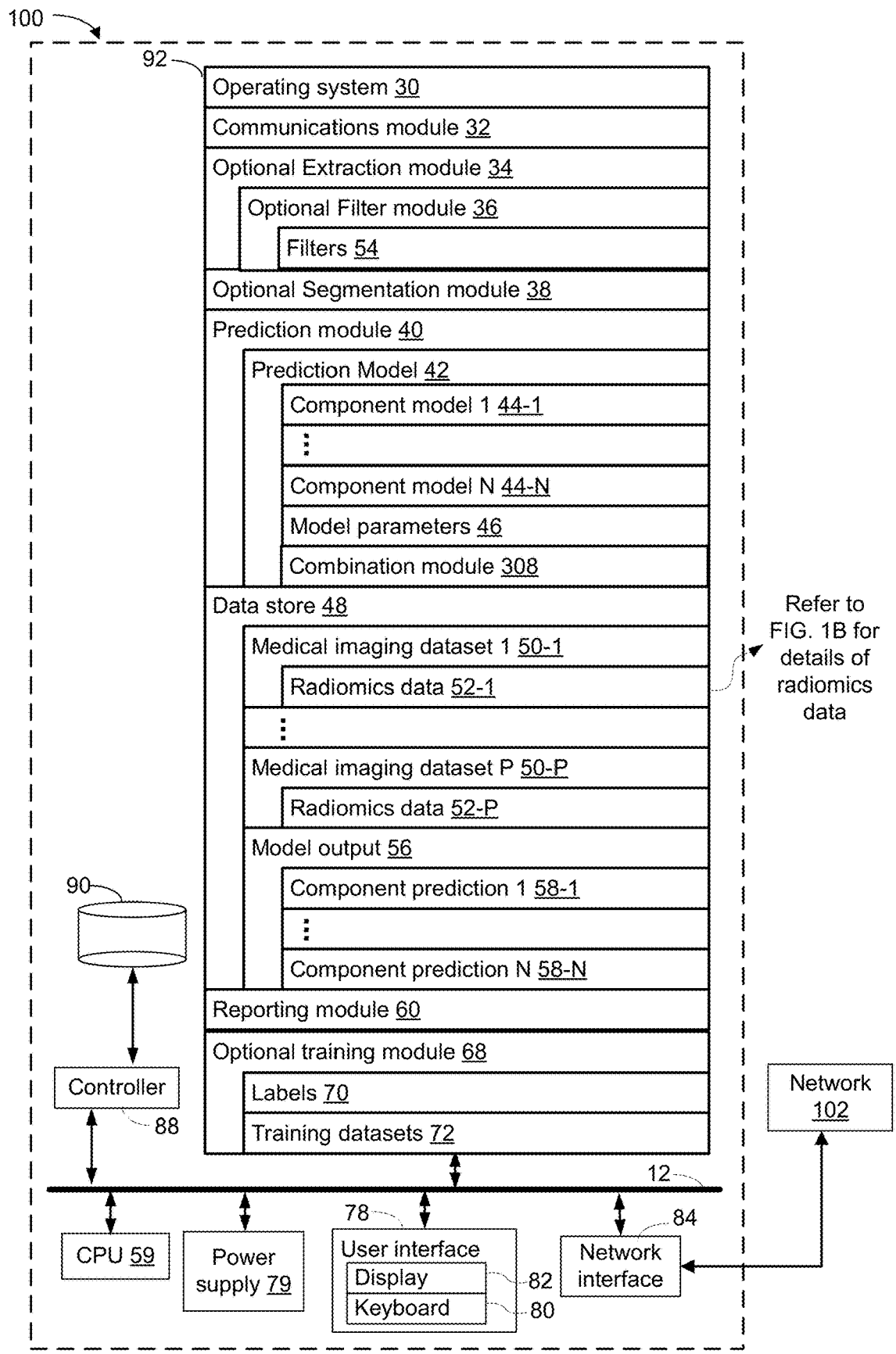

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the embodiments.

Disclosed are systems and methods for characterizing a cancer condition of a tissue in a subject using radiomics features. One of the major challenges in building risk models using radiomics has to do with the large number of radiomics features that can be extracted from medical images. Many of the features are correlated to each other, and it is unclear which features, or groups of features, are more important than others for cancer condition characterization. These factors can result in the training of models that do not generalize well.

Advantageously, the present disclosure provides methods and systems for characterizing a cancer condition using radiomics by utilizing a wide breadth of individually weak radiomics features to create a competitive risk model that generalizes better than existing radiomic models. In some implementations, the methods and systems described herein use hundreds or thousands of weak radiomics features but split these features into feature subsets. Individual feature sets are then evaluated using separate risk models, the outputs of which are combined into an ensemble risk model.

In some embodiments, features are split into groups based on the source and/or filter status of the radiomic image. For example, in some embodiments, features generated from an unfiltered radiomics image are grouped separately from features generated from a filtered radiomics image, regardless of the feature generation methodology. That is, in some embodiments, a first instance of the same feature (e.g., entropy) is grouped into a first feature subgroup when determined from an unfiltered image while a second instance of the same feature (e.g., entropy again) is grouped into a second feature subgroup when determined from a filtered version of the same image.

In some embodiments, features are additionally or alternatively split into groups based on the methodology used to generate the feature. This second distinction separates out the many highly related features generated with a specific methodology from separate groups of features generated using a different methodology. For example, in some embodiments, Gray Level Co-occurrence Matrix (GLCM) features are sorted into a separate group from Gray Level Run Length Matrix (GLRLM) features. Similarly, in some embodiments, local binary pattern (LBP) features are separated from local ternary pattern (LTP) features which will both be separate from GLCM and GLRLM features.

In some embodiments, ensemble models are used to achieve better generalization. Often, radiomics models do not generalize well when presented with new data, particularly when training models with larger input feature sets. For instance, as described in the example, when a large set of features was used to train forty component models for stratifying non-small cell lung cancer patient survival using leave-one-out training, the models had unsatisfactory statistical significance.

Figure 4:
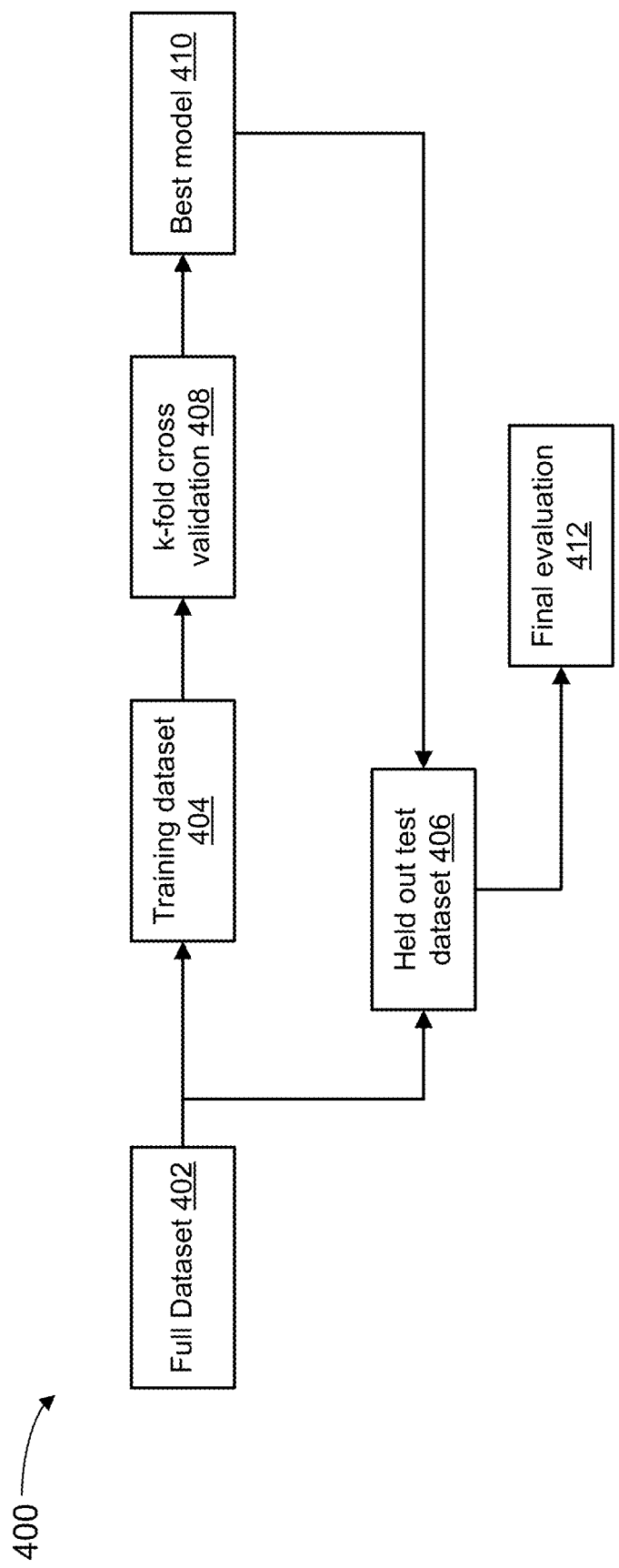
FIG. 4 illustrates a process for training a model to categorize a cancer condition of a tissue in a subject, in accordance with some embodiments of the present disclosure.

Advantageously, the methods and systems for training and using ensemble models described herein improve the generalization of radiomics models. In some embodiments, the methods and systems described herein achieve improved generalization, at least in part, by keeping feature sets used to train individual models relatively small to prevent overtraining. Further, in some embodiments, the methods and systems described herein maintain the predictive power of a large number of weak radiomic features, while being more robust and generalizable, by ensembling many overlapping, but correlated models. For example, as also described in the example, when the component models were trained together as an ensemble model using a K-fold training scheme illustrated in FIG. 4, the ensemble model had better performance and statistical significance than the individual component models.

Figure 3:
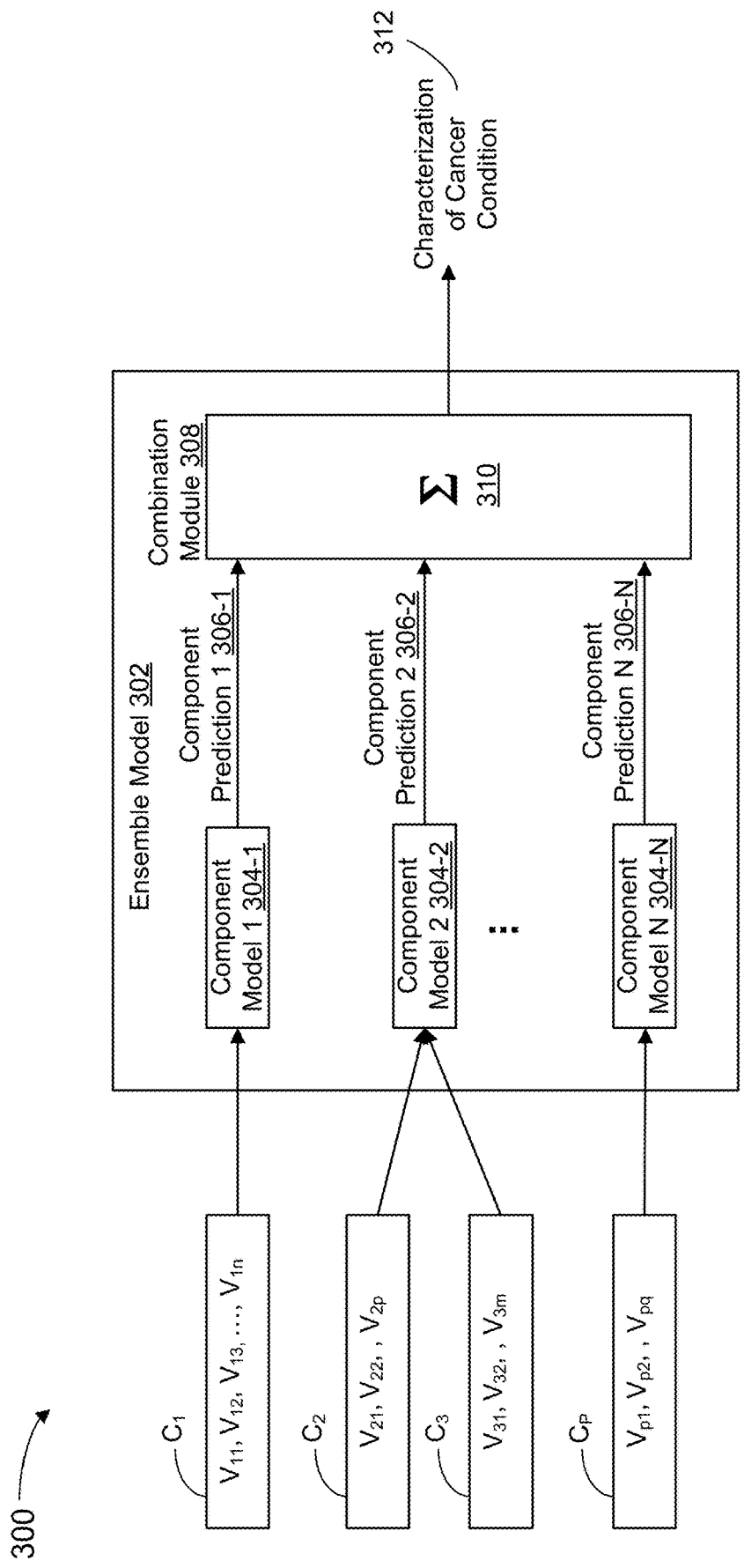
FIG. 3 illustrates a process for categorizing a cancer condition of a tissue in a subject, in accordance with some embodiments of the present disclosure.

FIG. 3 illustrates an example process 300 that uses radiomics features for characterizing a cancer condition, which addresses these challenges and other needs. The process 300 utilizes an ensemble model 302 that includes multiple distinct component models 304 (e.g., component model 1 304-1, component model 2 304-2, and component model N 304-N (e.g., risk models). Each respective distinct component model obtains, as input, corresponding values of radiomics features from one or more respective classes of radiomics features. In the example of FIG. 3, component model 1 304-1 obtains, as input, values $\{V_{11}, V_{12}, \ldots, V_{1n}\}$ corresponding to radiomics features $\{F_{11}, F_{12}, \ldots, F_{1n}\}$ in a class $C_1$ of radiomics features. Component model 2 304-2 obtains, as input, values $\{V_{21}, V_{22}, \ldots, V_{2p}\}$ corresponding to radiomics features $\{F_{21}, F_{22}, \ldots, F_{2n}\}$ in a class $C_2$ of radiomics features, and values $\{V_{31}, V_{32}, \ldots, V_{3m}\}$ corresponding to radiomics features $\{F_{31}, F_{32}, \ldots, F_{3m}\}$ in a class $C_3$ of radiomics features. Component model N 304-N obtains, as input, values $\{V_{p1}, V_{p2}, \ldots, V_{pq}\}$ corresponding to radiomics features $\{F_{p1}, F_{p2}, \ldots, F_{pq}\}$ in a class $C_p$ of radiomics features. In some embodiments, each of the component models 304 outputs a respective component prediction 306. In some embodiments, the ensemble model 302 includes a combination module 308 combines the component predictions 306 (e.g., by applying an aggregation operation 310) and outputs a characterization of the cancer condition 312.

In some embodiments, the radiomics features are categorized into classes (e.g., groups) according to the source images (e.g., medical images, source dataset, original dataset, etc.) and its filtered status. For example, in some embodiments, the radiomics features comprise gray-level co-occurrence matrix (GLCM) features (e.g., having the GLCM class). GLCM features generated from original (e.g., unfiltered) medical images belong to a category separate from GLCM features generated from altered (e.g., filtered) medical images.

In some embodiments, the radiomics features are categorized into classes according to their respective feature generation methodology. As an example, GLCM features are generated by determining how often pairs of pixels with specific values and in a specified spatial relationship occur in an image, whereas gray level run length matrix (GLRLM) features are generated by determining the length in number of pixels, of consecutive pixels, that have the same gray level value. In this example, GLCM features and GLRLM features belong to different classes. As another example, a class of local binary pattern (LBP) features are separated from a class of local ternary pattern (LTP) features, which will both be separate from GLCM and GLRLM features.

In some embodiments, each respective class of radiomic features in the plurality of classes of radiomic features is configured to provide a quantitative evaluation of a medical image in the plurality of medical images in the medical dataset by transforming the medical image into a corresponding dataset, such as one or more image biomarkers. For instance, some embodiments, each respective class of radiomic features in the plurality of classes of radiomic features is configured to provide the corresponding dataset by uniquely providing the quantitative evaluation through preprocessing one or more volumes of interests or regions of interests of the medical image, segmenting the one or more volumes of interests or regions of interests of the medical image, acquisition and/or reconstruction of the medical image, feature extraction, feature selection, statistical analysis, model development (e.g., machine learning model predictive modelling), or a combination thereof. As a non-limiting example, in some embodiments, the statistical respective class of radiomic features includes an unmodified intensity class of radiomic features, a discretized intensity class of radiomic features, a gray-level intensity class of radiomic features, or a combination thereof. In some embodiments, each respective class of radiomic features in the plurality of classes of radiomic features is a statistical radiomic feature class (e.g., histogram-based class of radiomic features, a texture-based class of radiomic features, etc.), a model-based radiomic feature class, a transform-based radiomic feature class, or a shape-based radiomic feature class. In some embodiments, a respective class of radiomic features in the plurality of classes of radiomic features is either a two-dimensional (2D) region of interest-based class of radiomic features or a three-dimensional (3D) volume of interest-based class of radiomic features. However, the present disclosure is not limited thereto. Additional details and information regarding classes of radiometric features is found at Mayerhoefer et al., 2020,"Introduction to Radiomics," Journal of Nuclear Medicine, 61(4), pg. 488-495; Traverso et al., 2018, "Repeatability and Reproducibility of Radiomic Features: A Systematic Review," International Journal of Radiation Oncology*Biology*Physics, 102 (4), pg. 1143-1158, each of which is hereby incorporated by reference in its entirety for all purposes.

In some embodiments, each respective component model in the plurality of component models is configured to utilize between 2 and 8 classes of radiomic features I the plurality of classes of radiomic features, between 2 and 7 classes of radiomic features, between 2 and 6 classes of radiomic features, between 2 and 5 classes of radiomic features, between 2 and 4 classes of radiomic features, between 2 and 3 classes of radiomic features, between 3 and 8 classes of radiomic features, between 3 and 7 classes of radiomic features, between 3 and 6 classes of radiomic features, between 3 and 5 classes of radiomic features, between 3 and 4 classes of radiomic features, between 4 and 8 classes of radiomic features, between 4 and 7 classes of radiomic features, between 4 and 6 classes of radiomic features, between 4 and 5 classes of radiomic features, between 5 and 8 classes of radiomic features, between 5 and 7 classes of radiomic features, between 5 and 6 classes of radiomic features, between 6 and 8 classes of radiomic features, between 6 and 7 classes of radiomic features, or between 7 and 8 classes of radiomic features. In some embodiments, each respective component model in the plurality of component models is configured to utilize at least 2 classes of radiomic features, at least 3 classes of radiomic features, at least 4 classes of radiomic features, at least 5 classes of radiomic features, at least 6 classes of radiomic features, at least 7 classes of radiomic features, or at least 8 classes of radiomic features. In some embodiments, each respective component model in the plurality of component models is configured to utilize at most 2 classes of radiomic features, at most 3 classes of radiomic features, at most 4 classes of radiomic features, at most 5 classes of radiomic features, at most 6 classes of radiomic features, at most 7 classes of radiomic features, or at most 8 classes of radiomic features. For instance, in some embodiments, the plurality of component models comprises at least two component models, and each respective component model in the at least two component models is configured to utilize a unique subset of classes of radiomic features in the plurality of radiomic features. In some embodiments, each respective component model in the at least two component models is configured to utilize a disjoint subset of classes of radiomic features in the plurality of radiomic features, such that each respective component model in the at least two component models does not have overlapping that have nonoverlapping classes of radiomic features from the plurality of classes of radiomic features. As a non-limiting example, in some embodiments, a first component model in the at least two component models include three classes of radiomic features from the plurality of classes of radiomic features (e.g., a first class of radiomic features, a second class of radiomic features, and a third class of radiomic features from the plurality of classes of radiomic features), a second component model in the at least two component models includes four classes of radiomic features from the plurality of classes of radiomic features (e.g., a fourth class of radiomic features, a fifth class of radiomic features, a sixth class of radiomic features, and a seventh class of radiomic features from the plurality of classes of radiomic features), and a third component model in the at least two component models includes one class of radiomic features from the plurality of classes of radiomic features (e.g., an eighth class of radiomic features from the plurality of classes of radiomic features), in which the first class of radiomic features, the second class of radiomic features, the third class of radiomic features, the fourth class of radiomic features, the fifth class of radiomic features, the sixth class of radiomic features, the seventh class of radiomic features, and the eighth class of radiomic features from the plurality of classes of radiomic features are all different classes of radiomic features from each other.

Now that an overview of improved systems and methods for structuring medical data to enable machine learning has been presented, additional details of systems, devices, and/or processes in accordance with the present disclosure are now described in relation to FIGS. 1, 2, 4, 5, and 6.

FIG. 1A illustrates a computer system for characterizing cancer conditions of tissues in subjects, in accordance with some embodiments of the present disclosure.

In typical embodiments, the computer system 100 comprises one or more computers. For purposes of illustration in FIG. 1A, the computer system 100 is represented as a single computer that includes all of the functionality of the disclosed computer system 100. However, the present disclosure is not so limited. The functionality of the computer system 100 may be spread across any number of networked computers and/or reside on each of several networked computers and/or virtual machines. One of skill in the art will appreciate that a wide array of different computer topologies are possible for the computer system 100 and all such topologies are within the scope of the present disclosure.

Turning to FIG. 1A with the foregoing in mind, the computer system 100 comprises one or more processing units (CPUs) 59, a network or other communications interface 84, a user interface 78 (e.g., including an optional display 82 and optional keyboard 80 or other form of input device), a memory 92 (e.g., random access memory, persistent memory, or combination thereof), one or more magnetic disk storage and/or persistent devices 90 optionally accessed by one or more controllers 88, one or more communication busses 12 for interconnecting the aforementioned components, and a power supply 79 for powering the aforementioned components. To the extent that components of memory 92 are not persistent, data in memory 92 can be seamlessly shared with non-volatile memory 90 or portions of memory 92 that are non-volatile or persistent using known computing techniques such as caching. Memory 92 and/or memory 90 can include mass storage that is remotely located with respect to the central processing unit(s) 59. In other words, some data stored in memory 92 and/or memory 90 may in fact be hosted on computers that are external to computer system 100 but that can be electronically accessed by the computer system 100 over network 102 (e.g., an Internet, intranet, or other form of network or electronic cable) using network interface 84. In some embodiments, the computer system 100 makes use of models that are run from the memory associated with one or more graphical processing units in order to improve the speed and performance of the system. In some alternative embodiments, the computer system 100 makes use of models that are run from memory 92 rather than memory associated with a graphical processing unit.

The memory 92 of the computer system 100 stores:
an operating system 30 that includes procedures for handling various basic system services;
a communication module 32, which connects to and communicates with other network devices (e.g., a local network, such as a router that provides Internet connectivity, networked storage devices, network routing devices, server systems, other computer systems 100, and/or other connected devices) coupled to one or more communication networks via the network interface 84 (e.g., wired or wireless);
an optional extraction module 34 for extracting radiomics data 50, such as radiomics features 64, from medical imaging datasets 50, including:
an optional filter module 36 for filtering medical imaging datasets 50 via one or more filtering methodologies and/or application of one or more filters 54; and
optional filters 54 (e.g., medical image filter algorithms) that are applied to the medical imaging datasets 50. In some embodiments, the filters 54 include one or more of: a wavelet transform filter, a Laplacian of Gaussian (LoG) filter, a square transform filter, a square root transform filter, a logarithm transform filter, an exponential transform filter, a gradient transform filter, a 2-dimensional local binary pattern filter, and a 3-dimensional local binary pattern filter;
an optional segmentation module 38 for segmenting medical images from medical imaging datasets 50 into segments and/or volumes;
a prediction module 40 for characterizing cancer conditions in subjects. In some embodiments, the prediction module 40 includes:
a prediction model 42. In some embodiments, the prediction model 42 comprises an ensemble model (e.g., ensemble model 302, FIG. 3) that includes a plurality of component models, such as component model 1 44-1 and component model N 44-N (e.g., component models 304, FIG. 3). In some embodiments, the plurality of component models is at least 3, at least 4, at least 5, at least 6, at least 7, at least 8, at least 9, at least 10, at least 15, at least 20, at least 25, at least 30, at least 35, at least 40, at least 45, at least 50, at least 75, at least 100, at least 150, or more component models. In some embodiments, each of the component models 44 is configured to output a respective component prediction 58 (e.g., component prediction 306, FIG. 3);

model parameters 46 (e.g., weights, biases, cluster centroids, etc.). In some embodiments, the model parameters 46 comprise at least 1,000, 5,000, 10,000, or 20,000 parameters; and a combination module 308 for combining the plurality of component predictions to obtain as output of the ensemble model a characterization of the cancer condition.

a data store 48 for for storing inputs and/or outputs from an ensemble model described herein (e.g., prediction model 42). In some embodiments, the data store 48 includes:

medical imaging datasets, such as a medical imaging dataset 1 50-1 and a medical imaging dataset P 50-P. In some embodiments, a respective medical imaging dataset includes corresponding radiomics data 52 (e.g., medical imaging dataset 1 50-1 includes radiomics data 52-1 and medical imaging dataset P 50-P includes radiomics data 52-P). FIG. 1B is a block diagram illustrating radiomics data for a respective medical imaging dataset, in accordance with some embodiments. In some embodiments, a respective medical imaging dataset includes a plurality of classes of radiomics features 62, such as radiomics features class 1 62-1 and radiomics features class Q 62-Q. A respective class of radiomics features 62 includes a respective plurality of radiomics features 64. For example, FIG. 1B shows that radiomics feature class 1 62-1 includes radiomics feature 1-1 64-1-1 and radiomics feature 1-M 64-1-M. Radiomics feature class Q 62-Q includes radiomics feature Q-1 64-Q-1 and radiomics feature Q-X 64-Q-X. In some embodiments, a respective class of radiomics features comprises at least 10, at least 25, at least 50, at least 100, or at least 250 corresponding radiomics features. In some embodiments, a respective class of radiomics features comprises no more than 1000, no more than 750, no more than 500, no more than 250, or no more than 100 corresponding radiomics features. Each radiomics feature 64 has a corresponding value 66;

model output 56. In some embodiments, the model output 56 comprises one or more (e.g., a combination of) component predictions 58 from respective component models 44;

a reporting module 60, e.g., for generating a report for a clinician or patient based on a characterization of the cancer condition from an ensemble model (e.g., prediction model 42 and/or component models 44); and an optional training module 68 that includes labels 70 and one or more training datasets 72, for training the prediction model 42 and/or component models 44.

In some embodiments, one or more of the above identified data elements or modules of the computer system 100 are stored in one or more of the previously mentioned memory devices, and correspond to a set of instructions for performing a function described above. The above identified data, modules or programs (e.g., sets of instructions) need not be implemented as separate software programs, procedures or modules, and thus various subsets of these modules may be combined or otherwise re-arranged in various implementations. In some implementations, the memory 92 and/or 90 optionally stores a subset of the modules and data structures identified above. Furthermore, in some embodiments the memory 92 and/or 90 stores additional modules and data structures not described above. Details of the modules and data structures identified above are further described below in reference to FIGS. 2-6.

FIGS. 2A, 2B, 2C, 2D, 2E, 2F, 2G, 2H, 2I, 2J, 2K, 2L, 2M, 2N, and 2O collectively provide a flowchart for an example method 200 for characterizing a cancer condition in a subject, in accordance with some embodiments. In some embodiments, the method 200 is performed at a computer system 100 that includes one or more processors (e.g., CPU 59) and memory (e.g., memory 90 or memory 92). In some embodiments, the computer system 100 performs the steps as noted in FIG. 2.

In FIG. 2A, referring to block 202, in some embodiments, the method includes prior to inputting information into an ensemble model, extracting (e.g., via optional extraction module 34), for each respective class of radiomics features in a first subset of classes of radiomics features (e.g., a subset of radiomics feature classes extracted from the set of medical images when treated using the same filter, or when unfiltered), a corresponding value for each respective radiomic feature in the respective class of radiomics features in the first subset of classes of radiomics features from a region of interest (ROI) or a volume of interest (VOI) in an unfiltered version of a plurality of medical images (e.g., source dataset, original dataset) (e.g., medical imaging dataset 50) of a tissue in a subject acquired at a first time using a first medical imaging modality. For instance, in some embodiments, the plurality of medical images comprises one or more two-dimensional representations of a respective tissue (e.g., a digital image of a first tissue) and/or one or more three-dimensional representations of the respective tissue (e.g., a volumetric body or representation of the first tissue). In some embodiments, the plurality of images collectively provides a three-dimensional image of tissue. Several software packages for extracting features from medical image sets are known in the art, including the PyRadiomics package, the Cancer Imaging Phenomics Toolkit (CaPTk), and the Standardized Environment for Radiomics Analysis (SERA) package. For more information on the PyRadiomics, CaPTk, and SERA packages see, for example, van Griethuysen, J J, et al., *Computational Radiomics System to Decode the Radiographic Phenotype,* Cancer Research, 77(21):e104-e107 (2017), Pati S., et al., *The Cancer Imaging Phenomics Toolkit (CaPTk): Technical Overview,* Springer—BrainLes 2019—LNCS, 11993:380-394 (2020), and Ashrafinia, S., *Quantitative Nuclear Medicine Imaging using Advanced Image Reconstruction and Radiomics,* Ph.D. Dissertation, Johns Hopkins University (2019), respectively, which are each disclosed by reference herein in their entireties.

In some embodiments, feature extraction includes steps of (i) segmenting images and delineating a region of interest (ROI) in two-dimensional space or a volume of interest (VOI) in three-dimensional space, e.g., defining a tumor or cancerous mass, (ii) image processing to homogenize images across data sets, and (iii) extracting features from the segmented and processed images as well as filtered versions of these images. For a review of the feature extraction process see, for example, van Timmeren, J., Cester, D., Tanadini-Lang, S. et al., *Radiomics in medical imaging— "how-to" guide and critical reflection,* Insights Imaging, 11:91 (2020), which is incorporated herein by reference in its entirety for all purposes.

Referring to block 204, in some embodiments, the method includes identifying (e.g., via optional segmentation module 38) the ROI or the VOI in the plurality of medical images. Referring to block 206, in some embodiments, the method includes segmenting (e.g., via optional segmentation module 38) the unfiltered version of the plurality of medical images into a plurality of segments or a plurality of volumes. Multiple software packages are available for image segmentation and ROI/VOI identification, including 3D Slicer, MITK, ITK-SNAP, MeVisLab, LifEx, and ImageJ. For further review of these packages see, for example, van Timmeren, J., et al., Supra.

Referring to block 208, in some embodiments, the method includes assigning, to each respective segment in the plurality of segments or to each respective volume in the plurality of volumes, a respective tissue classification in a plurality of tissue classifications based on one or more features of the respective segment or respective volume. In some embodiments, pixel values (e.g., individual pixel values, binned pixel values, locally averaged pixel values, or normalized pixel values, etc.), are input into a model trained to distinguish between different tissue types. For example, Ferl, G Z, et al., *Automated segmentation of lungs and lung tumors in mouse micro-CT scans,* iScience, 25(12):105712 (2022), which is disclosed herein by reference in its entirety, describes two-step method for automated segmenting of healthy, tumor-bearing, and fibrotic lungs, in which a 3 dimensional CNN U-net trained to segment lung tissue is used to identify lung tissue within a micro-CT image set and a support vector machine (SVM) is used to distinguish between healthy, cancerous, and fibrotic tissue within the identified lung tissue.

Accordingly, in some embodiments, the method includes inputting corresponding pixel or binned pixel values for a plurality of pixels or binned pixels from the medical imaging dataset into a model, wherein the model applies a plurality of parameters to the corresponding pixel or binned pixel values through a plurality of computations to generate as output from the model identification of a ROI or VOI.

In some embodiments, the plurality of pixels or binned pixels is at least 100 pixels or binned pixels, at least 1000 pixels or binned pixels, at least 10,000 pixels or binned pixels, at least 100,000 pixels or binned pixels, at least 1 million pixels or binned pixels, at least 10 million pixels or binned pixels, at least 100 million pixels or binned pixels, or at least 1 billion pixels or binned pixels. In some embodiments, the plurality of pixels or binned pixels is no more than 100 billion pixels or binned pixels, no more than 10 billion pixels or binned pixels, no more than 1 billion pixels or binned pixels, no more than 100 million pixels or binned pixels, no more than 10 million pixels or binned pixels, or less pixels or binned pixels. In some embodiments, the plurality of pixels or binned pixels is from 10,000 to 100 billion, from 100,000 to 100 billion, from 1 million to 100 billion, from 10 million to 100 billion, from 10,000 to 10 billion, from 100,000 to 10 billion, from 1 million to 10 billion, from 10 million to 10 billion, from 10,000 to 1 billion, from 100,000 to 1 billion, from 1 million to 1 billion, from 10 million to 1 billion, from 10,000 to 100 million, from 100,000 to 100 million, from 1 million to 100 million, or from 10 million to 100 million pixels or binned pixels.

In some embodiments, the plurality of parameters is at least 100, at least 1000, at least 10,000, at least 100,000, at least 1 million, at least 10 million, at least 100 million, at least 1 billion, or more parameters. In some embodiments, the plurality of parameters is no more than 100 billion, no more than 10 billion, no more than 1 billion, no more than 100 million, no more than 10 million, or less parameters. In some embodiments, the plurality of parameters is from 10,000 to 100 billion, from 100,000 to 100 billion, from 1 million to 100 billion, from 10 million to 100 billion, from 10,000 to 10 billion, from 100,000 to 10 billion, from 1 million to 10 billion, from 10 million to 10 billion, from 10,000 to 1 billion, from 100,000 to 1 billion, from 1 million to 1 billion, from 10 million to 1 billion, from 10,000 to 100 million, from 100,000 to 100 million, from 1 million to 100 million, or from 10 million to 100 million parameters.

In some embodiments, the plurality of computations is at least 100, at least 1000, at least 10,000, at least 100,000, at least 1 million, at least 10 million, at least 100 million, at least 1 billion, or more computations. In some embodiments, the plurality of computations is no more than 100 billion, no more than 10 billion, no more than 1 billion, no more than 100 million, no more than 10 million, or less computations. In some embodiments, the plurality of computations is from 10,000 to 100 billion, from 100,000 to 100 billion, from 1 million to 100 billion, from 10 million to 100 billion, from 10,000 to 10 billion, from 100,000 to 10 billion, from 1 million to 10 billion, from 10 million to 10 billion, from 10,000 to 1 billion, from 100,000 to 1 billion, from 1 million to 1 billion, from 10 million to 1 billion, from 10,000 to 100 million, from 100,000 to 100 million, from 1 million to 100 million, or from 10 million to 100 million computations.

In some embodiments, the method includes inputting corresponding pixel or binned pixel values for a plurality of pixels or binned pixels from an identified ROI or VOI into a model, wherein the model applies a plurality of parameters to the corresponding pixel or binned pixel values through a plurality of computations to generate as output from the model a tissue classification for each pixel or binned pixels in the identified ROI or VOI. In some embodiments, the one or more classifications include cancerous tissue and non-cancerous tissue. In some embodiments, the one or more classifications include a cancer subtype, a cancer grade, and/or a cancer stage. In some embodiments, the one or more classifications include a non-cancerous phenotype, e.g., fibrotic tissue.

In some embodiments, the plurality of pixels or binned pixels is at least 100, at least 1000, at least 10,000, at least 100,000, at least 1 million, at least 10 million, at least 100 million, at least 1 billion, or more pixels or binned pixels. In some embodiments, the plurality of pixels or binned pixels is no more than 100 billion, no more than 10 billion, no more than 1 billion, no more than 100 million, no more than 10 million, or less pixels or binned pixels. In some embodiments, the plurality of pixels or binned pixels is from 10,000 to 100 billion, from 100,000 to 100 billion, from 1 million to 100 billion, from 10 million to 100 billion, from 10,000 to 10 billion, from 100,000 to 10 billion, from 1 million to 10 billion, from 10 million to 10 billion, from 10,000 to 1 billion, from 100,000 to 1 billion, from 1 million to 1 billion, from 10 million to 1 billion, from 10,000 to 100 million, from 100,000 to 100 million, from 1 million to 100 million, or from 10 million to 100 million pixels or binned pixels.

In some embodiments, the plurality of parameters is at least 100, at least 1000, at least 10,000, at least 100,000, at least 1 million, at least 10 million, at least 100 million, at least 1 billion, or more parameters. In some embodiments, the plurality of parameters is no more than 100 billion, no more than 10 billion, no more than 1 billion, no more than 100 million, no more than 10 million, or less parameters. In some embodiments, the plurality of parameters is from 10,000 to 100 billion, from 100,000 to 100 billion, from 1 million to 100 billion, from 10 million to 100 billion, from 10,000 to 10 billion, from 100,000 to 10 billion, from 1 million to 10 billion, from 10 million to 10 billion, from 10,000 to 1 billion, from 100,000 to 1 billion, from 1 million to 1 billion, from 10 million to 1 billion, from 10,000 to 100 million, from 100,000 to 100 million, from 1 million to 100 million, or from 10 million to 100 million parameters.

In some embodiments, the plurality of computations is at least 100, at least 1000, at least 10,000, at least 100,000, at least 1 million, at least 10 million, at least 100 million, at least 1 billion, or more computations. In some embodiments, the plurality of computations is no more than 100 billion, no more than 10 billion, no more than 1 billion, no more than 100 million, no more than 10 million, or less computations. In some embodiments, the plurality of computations is from 10,000 to 100 billion, from 100,000 to 100 billion, from 1 million to 100 billion, from 10 million to 100 billion, from 10,000 to 10 billion, from 100,000 to 10 billion, from 1 million to 10 billion, from 10 million to 10 billion, from 10,000 to 1 billion, from 100,000 to 1 billion, from 1 million to 1 billion, from 10 million to 1 billion, from 10,000 to 100 million, from 100,000 to 100 million, from 1 million to 100 million, or from 10 million to 100 million computations.

Referring to block 210, in some embodiments, the method includes grouping respective segments in the plurality of segments or respective volumes in the plurality of volumes assigned a target tissue classification in the plurality of tissue classifications, thereby identifying the ROI or the VOI. Further examples of method and systems for segmenting medical images are disclosed in U.S. Pat. No. 10,991,097, titled "Artificial intelligence segmentation of tissue images," which is hereby incorporated by reference herein in its entirety for all purposes.

Referring to block 211, in some embodiments, the method includes extracting, for each respective class of radiomics features in a second subset of classes of radiomics features, a corresponding value for each respective radiomic feature in the respective class of radiomics features in the second subset of classes of radiomics features from an ROI or a VOI in a filtered version of the plurality of medical images.

Referring to block 212, in some embodiments, the method includes inputting information into an ensemble model (e.g., prediction model 42, ensemble model 302) comprising a plurality of component models (e.g., component models 44, component models 304) to obtain as output from each respective component model in the plurality of component models a corresponding component prediction for the cancer condition, thereby obtaining a plurality of component predictions (e.g., component predictions 58, component predictions 306) for the cancer condition. The information comprises, for each respective class of radiomics features in a plurality of classes of radiomics features (e.g., radiomics features class 62-1 to 62-Q), a corresponding value (e.g., value 66-1-1, value 66-1-M, value 66-Q-1, value 66-Q-M) for each respective radiomic feature in a corresponding plurality of radiomics features (e.g., radiomics feature 64-1-1, radiomics feature 64-1-M, radiomics feature 6$q$-Q-1, radiomics feature 64-Q-X) of the respective class of radiomics features obtained from a medical imaging dataset, where the medical imaging dataset comprises the plurality of medical images of the tissue in the subject acquired at the first time using the first medical imaging modality. The ensemble model comprises a plurality of parameters. The inputting includes (i) inputting the corresponding value for each respective radiomics feature in the corresponding plurality of radiomics features of a first respective class of radiomics features in the plurality of classes of radiomics features into a first respective component model in the plurality of component models and (ii) inputting the corresponding value for each respective radiomics feature in the corresponding plurality of radiomics features of a second respective class of radiomics features in the plurality of classes of radiomics features into a second respective component model in the plurality of component models. The corresponding value for no respective radiomics feature in the corresponding plurality of radiomics features of the first respective class of radiomics features is input into the second component model and the corresponding value for no respective radiomics feature in the corresponding plurality of radiomics features of the second respective class of radiomics features is input into the first respective component model.

Generally, the parameters used for feature extraction will depend upon the image modality/acquisition parameters used to collect the medical images and/or the content of the image. There is a balancing between filtering out noise and averaging out features in the data. For further discussion of this balance see, for example, van Timmeren, J., et al., Supra.

For example, in some embodiments, where the medical imaging dataset is obtained by magnetic resonance imaging (MRI), e.g., brain MRI, images in the dataset are normalized, e.g., to a scale of 0-100 or 0-1. In some embodiments, the images (e.g., normalized images) are resampled using an isotropic voxel spacing, e.g., 1×1×1 mm voxel spacing, using a fixed bin width, e.g., of 5 mm. In other embodiments, a fixed number of bins is used for discretization. In some embodiments, lesion ROIs are grouped based on connectivity and distance. Features are extracted from ROIs in original and transformed image types. In some embodiments, some or all of the features are also determined using original images with original spacing and without normalization. In some embodiments, at least shape features are also determined using original images with original spacing and without normalization.

As another example, in some embodiments where the medical imaging dataset is obtained by position emission tomography (PET) scan, e.g., whole-body PET, the imaging dataset is resampled using an isotropic voxel spacing, e.g., 3×3×3 mm voxel spacing, using a fixed bin width. In some embodiments, the images are not normalized. Lesion ROIs are grouped based on connectivity. Features are extracted from ROIs using original and transformed image types. In some embodiments, some or all of the features are also determined using original images with original spacing and without normalization. In some embodiments, at least shape features are also determined using original images with original spacing and without normalization.

As another example, in some embodiments where the medical imaging dataset is obtained by computed tomography (CT), e.g., lung CT, the images are resampled using an isotropic voxel spacing, e.g., 1×1×1 mm voxel spacing, using a fixed bin width, e.g., of 25. Here, the term "fixed bin width" is related to the process of converting the raw CT data (attenuation values measured by the CT scanner) into the final image that represents the tissue density. This process is called "binning," and the "bin width" refers to the range of attenuation values grouped together to create a specific shade of gray in the final image. By using a "fixed bin width," the CT data is mapped consistently into a fixed number of grayscale levels. This helps standardize the image quality and makes it easier to compare and analyze CT images taken at different times or by different scanners. In some embodiments, the images are not normalized. Features are extracted from ROIs in original and transformed image types.

Referring to block 214, in some embodiments, the plurality of parameters in the ensemble model is at least 100, at least 1000, at least 10,000, at least 100,000, at least 1 million, at least 10 million, at least 100 million, at least 1 billion, or more parameters. In some embodiments, the plurality of parameters is no more than 100 billion, no more than 10 billion, no more than 1 billion, no more than 100 million, no more than 10 million, or less parameters. In some embodiments, the plurality of parameters is from 10,000 to 100 billion, from 100,000 to 100 billion, from 1 million to 100 billion, from 10 million to 100 billion, from 10,000 to 10 billion, from 100,000 to 10 billion, from 1 million to 10 billion, from 10 million to 10 billion, from 10,000 to 1 billion, from 100,000 to 1 billion, from 1 million to 1 billion, from 10 million to 1 billion, from 10,000 to 100 million, from 100,000 to 100 million, from 1 million to 100 million, or from 10 million to 100 million parameters.

The ensemble model applies a plurality of parameters to the information through a plurality of computations to generate as output from the model the plurality of component predictions for the cancer condition. In some embodiments, the plurality of computations is at least 100, at least 1000, at least 10,000, at least 100,000, at least 1 million, at least 10 million, at least 100 million, at least 1 billion, or more computations. In some embodiments, the plurality of computations is no more than 100 billion, no more than 10 billion, no more than 1 billion, no more than 100 million, no more than 10 million, or less computations. In some embodiments, the plurality of computations is from 10,000 to 100 billion, from 100,000 to 100 billion, from 1 million to 100 billion, from 10 million to 100 billion, from 10,000 to 10 billion, from 100,000 to 10 billion, from 1 million to 10 billion, from 10 million to 10 billion, from 10,000 to 1 billion, from 100,000 to 1 billion, from 1 million to 1 billion, from 10 million to 1 billion, from 10,000 to 100 million, from 100,000 to 100 million, from 1 million to 100 million, or from 10 million to 100 million computations.

In FIG. 2C, referring to block 216, in some embodiments, the cancer condition is a cancer selected from the group consisting of a carcinoma, lymphoma, blastoma, glioblastoma, sarcoma, leukemia, breast cancer, squamous cell cancer, lung cancer, small-cell lung cancer, non-small cell lung cancer (NSCLC), adenocarcinoma of the lung, squamous carcinoma of the lung, head and neck cancer, cancer of the peritoneum, hepatocellular cancer, gastric or stomach cancer, pancreatic cancer, ovarian cancer, cervical cancer, liver cancer, bladder cancer, hepatoma, colon cancer, colorectal cancer, endometrial or uterine carcinoma, salivary gland carcinoma, kidney or renal cancer, liver cancer, prostate cancer, vulval cancer, thyroid cancer, hepatic carcinoma, B-cell lymphoma, low grade/follicular non-Hodgkin's lymphoma (NHL), small lymphocytic (SL) NHL, intermediate grade/follicular NHL, intermediate grade diffuse NHL, high grade immunoblastic NHL, high grade lymphoblastic NHL, high grade small non-cleaved cell NHL, bulky disease NHL, mantle cell lymphoma, AIDS-related lymphoma, Waldenstrom's Macroglobulinemia, chronic lymphocytic leukemia (CLL), acute lymphoblastic leukemia (ALL), hairy cell leukemia, and chronic myeloblastic leukemia.

Referring to block 218, in some embodiments, the plurality of component models is at least 10 component models.

Referring to block 220, in some embodiments, the plurality of component models is at least 20 component models.

Referring to block 222, in some embodiments, the plurality of component models is at least 40 component models.

Referring to block 224, in some embodiments, the plurality of component models is no more than 250 component models.

Referring to block 226, in some embodiments, the plurality of component models is no more than 100 component models.

In FIG. 2D, referring to block 228, in some embodiments, the plurality of component models is no more than 50 component models.

Referring to block 230, in some embodiments, the plurality of component models is from 5 to 100 component models.

Referring to block 232, in some embodiments, the plurality of component models is from 10 to 75 component models.

Referring to block 234, in some embodiments, the plurality of component models from 20 to 50 component models.

As a non-limiting example, in some embodiments, the plurality of component models includes between 2 and 250 component models, between 2 and 150 component models, between 2 and 100 component models, between 2 and 150 component models, between 2 and 100 component models, between 2 and 75 component models, between 2 and 50 component models, between 2 and 30 component models, between 2 and 20 component models, between 2 and 15 component models, between 2 and 10 component models, between 2 and 5 component models, between 5 and 250 component models, between 5 and 150 component models, between 5 and 100 component models, between 5 and 150 component models, between 5 and 100 component models, between 5 and 75 component models, between 5 and 50 component models, between 5 and 30 component models, between 5 and 20 component models, between 5 and 15 component models, between 5 and 10 component models, between 15 and 150 component models, between 15 and 100 component models, between 15 and 150 component models, between 15 and 100 component models, between 15 and 75 component models, between 15 and 50 component models, between 15 and 30 component models, between 15 and 20 component models, between 35 and 150 component models, between 35 and 100 component models, between 35 and 150 component models, between 35 and 100 component models, between 35 and 75 component models, between 35 and 50 component models, between 65 and 150 component models, between 65 and 100 component models, between 65 and 150 component models, between 65 and 100 component models, between 65 and 75 component models, between 120 and 150 component models, between 120 and 250 component models, or between 120 and 150 component models. In some embodiments, the plurality of component models is at least 3, at least 4, at least 5, at least 6, at least 7, at least 8, at least 9, at least 10, at least 15, at least 20, at least 25, at least 30, at least 35, at least 40, at least 45, at least 50, at least 75, at least 100, at least 150, at least 200, at least 250, or more component models. In some embodiments, the plurality of component models is at most 3, at most 4, at most 5, at most 6, at most 7, at most 8, at most 9, at most 10, at most 15, at most 20, at most 25, at most 30, at most 35, at most 40, at most 45, at most 50, at most 75, at most 100, at most 150, at most 200, at most 250, or more component models.

Referring to block 236, in some embodiments, a respective component model in the plurality of component models is a neural network, a support vector machine, a Naive Bayes model, a nearest neighbor model, a boosted trees model, a random forests model, or a clustering model.

As used herein, the term "model" refers to a machine learning model, algorithm, or task.

In some embodiments, a model is an unsupervised learning algorithm. One example of an unsupervised learning algorithm is cluster analysis.

In some embodiments, a model is supervised machine learning. Nonlimiting examples of supervised learning algorithms include, but are not limited to, logistic regression, neural networks, support vector machines, Naive Bayes algorithms, nearest neighbor algorithms, random forest algorithms, decision tree algorithms, boosted trees algorithms, multinomial logistic regression algorithms, linear models, linear regression, GradientBoosting, mixture models, hidden Markov models, Gaussian NB algorithms, linear discriminant analysis, or any combinations thereof. In some embodiments, a model is a multinomial classifier algorithm. In some embodiments, a model is a 2-stage stochastic gradient descent (SGD) model. In some embodiments, a model is a deep neural network (e.g., a deep-and-wide sample-level classifier).

In some embodiments, a model is utilized to normalize a value or data set, such as by transforming the value or a set of values to a common frame of reference for comparison purposes. For example, in some embodiments, when one or more pixel values corresponding to one or more pixels in a respective image is normalized to a predetermined statistic (e.g., a mean and/or standard deviation of one or more pixel values across one or more images), the pixel values of the respective pixels are compared to the respective statistic so that the amount by which the pixel values differ from the statistic is determined.

In some embodiments, an untrained model (e.g., "untrained classifier" and/or "untrained neural network") includes a machine learning model or algorithm, such as a classifier or a neural network, that has not been trained on a target dataset. In some embodiments, training a model (e.g., training a neural network) refers to the process of training an untrained or partially trained model (e.g., an untrained or partially trained neural network). For instance, consider the case of a plurality of training samples comprising a corresponding plurality of medical images (e.g., of a medical dataset). The plurality of medical images is applied as collective input to an untrained or partially trained model, in conjunction with a corresponding measured indication of one or more features for each respective medical image (hereinafter training dataset) to train the untrained or partially trained model on indications that identify features related to morphological classes, thereby obtaining a trained model. Moreover, it will be appreciated that the term "untrained model" does not exclude the possibility that transfer learning techniques are used in such training of the untrained or partially trained model. For instance, Fernandes et al., 2017, "Transfer Learning with Partial Observability Applied to Cervical Cancer Screening," Pattern Recognition and Image Analysis: $8^{th}$ Iberian Conference Proceedings, 243-250, which is hereby incorporated by reference in its entirety for all purposes, provides non-limiting examples of such transfer learning. In instances where transfer learning is used, the untrained model described above is provided with additional data over and beyond that of the primary training dataset. That is, in non-limiting examples of transfer learning embodiments, the untrained model receives (i) the plurality of images and the measured indications for each respective image ("primary training dataset") and (ii) additional data. In some embodiments, this additional data is in the form of parameters (e.g., coefficients, weights, and/or hyperparameters) that were learned from another, auxiliary training dataset. Moreover, while a description of a single auxiliary training dataset has been disclosed, it will be appreciated that there is no limit on the number of auxiliary training datasets that may be used to complement the primary training dataset in training the untrained model in the present disclosure. For instance, in some embodiments, two or more auxiliary training datasets, three or more auxiliary training datasets, four or more auxiliary training datasets or five or more auxiliary training datasets are used to complement the primary training dataset through transfer learning, where each such auxiliary dataset is different than the primary training dataset. Any manner of transfer learning may be used in such embodiments. For instance, consider the case where there is a first auxiliary training dataset and a second auxiliary training dataset in addition to the primary training dataset. The parameters learned from the first auxiliary training dataset (by application of a first model to the first auxiliary training dataset) may be applied to the second auxiliary training dataset using transfer learning techniques (e.g., a second model that is the same or different from the first model), which in turn may result in a trained intermediate model whose parameters are then applied to the primary training dataset and this, in conjunction with the primary training dataset itself, is applied to the untrained model. Alternatively, a first set of parameters learned from the first auxiliary training dataset (by application of a first model to the first auxiliary training dataset) and a second set of parameters learned from the second auxiliary training dataset (by application of a second model that is the same or different from the first model to the second auxiliary training dataset) may each individually be applied to a separate instance of the primary training dataset (e.g., by separate independent matrix multiplications) and both such applications of the parameters to separate instances of the primary training dataset in conjunction with the primary training dataset itself (or some reduced form of the primary training dataset such as principal components or regression coefficients learned from the primary training set) may then be applied to the untrained model in order to train the untrained model. In some instances, additionally or alternatively, knowledge regarding objects related to morphological classes derived from an auxiliary training dataset is used, in conjunction with the object and/or class-labeled images in the primary training dataset, to train the untrained model.

Support vector machines. In some embodiments, the model is a support vector machine (SVM). SVM algorithms suitable for use as models are described in, for example, Cristianini and Shawe-Taylor, 2000, "An Introduction to Support Vector Machines," Cambridge University Press, Cambridge; Boser et al., 1992, "A training algorithm for optimal margin classifiers," in Proceedings of the 5th Annual ACM Workshop on Computational Learning Theory, ACM Press, Pittsburgh, Pa., pp. 142-152; Vapnik, 1998, Statistical Learning Theory, Wiley, New York; Mount, 2001, Bioinformatics: sequence and genome analysis, Cold Spring Harbor Laboratory Press, Cold Spring Harbor, N.Y.; Duda, Pattern Classification, Second Edition, 2001, John Wiley & Sons, Inc., pp. 259, 262-265; and Hastie, 2001, The Elements of Statistical Learning, Springer, New York; and Furey et al., 2000, Bioinformatics 16, 906-914, each of which is hereby incorporated by reference in its entirety for all purposes. When used for classification, SVMs separate a given set of binary labeled data with a hyper-plane that is maximally distant from the labeled data. For cases in which no linear separation is possible, SVMs can work in combination with the technique of 'kernels', which automatically realizes a non-linear mapping to a feature space. The hyper-plane found by the SVM in feature space can correspond to a non-linear decision boundary in the input space. In some embodiments, the plurality of parameters (e.g., weights) associated with the SVM define the hyper-plane. In some embodiments, the hyper-plane is defined by at least 10, at least 20, at least 50, or at least 100 parameters and the SVM model requires a computer to calculate because it cannot be mentally solved.

Naïve Bayes algorithms. In some embodiments, the model is a Naive Bayes algorithm. Naïve Bayes classifiers suitable for use as models are disclosed, for example, in Ng et al., 2002, "On discriminative vs. generative classifiers: A comparison of logistic regression and naive Bayes," Advances in Neural Information Processing Systems, 14, which is hereby incorporated by reference in its entirety for all purposes. A Naive Bayes classifier is any classifier in a family of "probabilistic classifiers" based on applying Bayes' theorem with strong (naïve) independence assumptions between the features. In some embodiments, they are coupled with Kernel density estimation. See, for example, Hastie et al., 2001, *The elements of statistical learning: data mining, inference, and prediction,* eds. Tibshirani and Friedman, Springer, New York, which is hereby incorporated by reference in its entirety for all purposes.

Nearest neighbor algorithms. In some embodiments, a model is a nearest neighbor algorithm. Nearest neighbor models can be memory-based and include no model to be fit. For nearest neighbors, given a query point $x_0$ (a first image), the k training points $x_{(r)}$, r, . . . , k (here the training images) closest in distance to $x_0$ are identified and then the point $x_0$ is classified using the k nearest neighbors. In some embodiments, the distance to these neighbors is a function of the values of a discriminating set. In some embodiments, Euclidean distance in feature space is used to determine distance as $d_{(i)}=\|x_{(i)}-x_{(O)}\|$. In some embodiments, when the nearest neighbor algorithm is used, the value data used to compute the linear discriminant is standardized to have mean zero and variance 1. The nearest neighbor rule can be refined to address issues of unequal class priors, differential misclassification costs, and feature selection. Many of these refinements involve some form of weighted voting for the neighbors. For more information on nearest neighbor analysis, see Duda, *Pattern Classification,* Second Edition, 2001, John Wiley & Sons, Inc; and Hastie, 2001, The Elements of Statistical Learning, Springer, New York, each of which is hereby incorporated by reference in its entirety for all purposes.

A k-nearest neighbor model is a non-parametric machine learning method in which the input consists of the k closest training examples in feature space. The output is a class membership. An object is classified by a plurality vote of its neighbors, with the object being assigned to the class most common among its k nearest neighbors (k is a positive integer, typically small). If k=1, then the object is simply assigned to the class of that single nearest neighbor. See, Duda et al., 2001, *Pattern Classification,* Second Edition, John Wiley & Sons, which is hereby incorporated by reference in its entirety for all purposes. In some embodiments, the number of distance calculations needed to solve the k-nearest neighbor model is such that a computer is used to solve the model for a given input because it cannot be mentally performed.

Random forest, decision tree, and boosted tree algorithms. In some embodiments, the model is a decision tree. Decision trees suitable for use as models are described generally by Duda, 2001, Pattern Classification, John Wiley & Sons, Inc., New York, pp. 395-396, which is hereby incorporated by reference in its entirety for all purposes. Tree-based methods partition the feature space into a set of rectangles, and then fit a model (like a constant) in each one. In some embodiments, the decision tree is random forest regression. One specific algorithm that can be used is a classification and regression tree (CART). Other specific decision tree algorithms include, but are not limited to, ID3, C4.5, MART, and Random Forests. CART, ID3, and C4.5 are described in Duda, 2001, Pattern Classification, John Wiley & Sons, Inc., New York, pp. 396-408 and pp. 411-412, which is hereby incorporated by reference in its entirety for all purposes. CART, MART, and C4.5 are described in Hastie et al., 2001, The Elements of Statistical Learning, Springer-Verlag, New York, Chapter 9, which is hereby incorporated by reference in its entirety for all purposes. Random Forests are described in Breiman, 1999, "Random Forests—Random Features," Technical Report 567, Statistics Department, U.C. Berkeley, September 1999, which is hereby incorporated by reference in its entirety for all purposes. In some embodiments, the decision tree model includes at least 10, at least 20, at least 50, or at least 100 parameters (e.g., weights and/or decisions) and requires a computer to calculate because it cannot be mentally solved.

Linear discriminant analysis algorithms. Linear discriminant analysis (LDA), normal discriminant analysis (NDA), or discriminant function analysis can be a generalization of Fisher's linear discriminant, a method used in statistics, pattern recognition, and machine learning to find a linear combination of features that characterizes or separates two or more classes of objects or events. The resulting combination can be used as the model (e.g., a linear classifier) in some embodiments of the present disclosure.

Mixture model and Hidden Markov model. In some embodiments, the model is a mixture model, such as that described in McLachlan et al., Bioinformatics 18(3):413-422, 2002. In some embodiments, in particular, those embodiments including a temporal component, the model is a hidden Markov model such as described by Schliep et al., 2003, Bioinformatics 19(1):i255-i263.

Clustering. In some embodiments, the model is an unsupervised clustering model. In some embodiments, the model is a supervised clustering model. Clustering algorithms suitable for use as models are described, for example, at pages 211-256 of Duda and Hart, Pattern Classification and Scene Analysis, 1973, John Wiley & Sons, Inc., New York, (hereinafter "Duda 1973") which is hereby incorporated by reference in its entirety for all purposes. The clustering problem can be described as one of finding natural groupings in a dataset. To identify natural groupings, two issues can be addressed. First, a way to measure similarity (or dissimilarity) between two samples can be determined. This metric (e.g., similarity measure) can be used to ensure that the samples in one cluster are more like one another than they are to samples in other clusters. Second, a mechanism for partitioning the data into clusters using the similarity measure can be determined. One way to begin a clustering investigation can be to define a distance function and to compute the matrix of distances between all pairs of samples in a training dataset. If distance is a good measure of similarity, then the distance between reference entities in the same cluster can be significantly less than the distance between the reference entities in different clusters. However, clustering may not use a distance metric. For example, a nonmetric similarity function s(x, x') can be used to compare two vectors x and x'. s(x, x') can be a symmetric function whose value is large when x and x' are somehow "similar." Once a method for measuring "similarity" or "dissimilarity" between points in a dataset has been selected, clustering can use a criterion function that measures the clustering quality of any partition of the data. Partitions of the data set that extremize the criterion function can be used to cluster the data. Particular exemplary clustering techniques that can be used in the present disclosure can include, but are not limited to, hierarchical clustering (agglomerative clustering using a nearest-neighbor algorithm, farthest-neighbor algorithm, the average linkage algorithm, the centroid algorithm, or the sum-of-squares algorithm), k-means clustering, fuzzy k-means clustering algorithm, and Jarvis-Patrick clustering. In some embodiments, the clustering includes unsupervised clustering (e.g., with no preconceived number of clusters and/or no predetermination of cluster assignments).

Ensembles of models and boosting. In some embodiments, an ensemble (two or more) of models is used. In some embodiments, a boosting technique such as AdaBoost is used in conjunction with many other types of learning algorithms to improve the performance of the model. In this approach, the output of any of the models disclosed herein, or their equivalents, is combined into a weighted sum that represents the final output of the boosted model. In some embodiments, the plurality of outputs from the models is combined using any measure of central tendency known in the art, including but not limited to a mean, median, mode, a weighted mean, weighted median, weighted mode, etc. In some embodiments, the plurality of outputs is combined using a voting method. In some embodiments, a respective model in the ensemble of models is weighted or unweighted.

The term "classification" can refer to any number(s) or other characters(s) that are associated with a particular property of a sample. For example, a "+" symbol (or the word "positive") can signify that a sample is classified as having a desired outcome or characteristic, whereas a "−" symbol (or the word "negative") can signify that a sample is classified as having an undesired outcome or characteristic. In another example, the term "classification" refers to a respective outcome or characteristic (e.g., high risk, medium risk, low risk). In some embodiments, the classification is binary (e.g., positive or negative) or has more levels of classification (e.g., a scale from 1 to 10 or 0 to 1). In some embodiments, the terms "cutoff" and "threshold" refer to predetermined numbers used in an operation. In one example, a cutoff value refers to a value above which results are excluded. In some embodiments, a threshold value is a value above or below which a particular classification applies. Either of these terms can be used in either of these contexts.

One of skill in the art will readily appreciate other models that are applicable to the systems and methods of the present disclosure. In some embodiments, the systems, methods, and devices of the present disclosure utilize more than one model to provide an evaluation (e.g., arrive at an evaluation given one or more inputs) with an increased accuracy. For instance, in some embodiments, each respective model arrives at a corresponding evaluation when provided a respective data set. Accordingly, each respective model can independently arrive at a result and then the result of each respective model is collectively verified through a comparison or amalgamation of the models. From this, a cumulative result is provided by the models. However, the present disclosure is not limited thereto.

In some embodiments, a respective model is tasked with performing a corresponding activity. As a non-limiting example, in some embodiments, the task performed by the respective model includes, but is not limited to, extracting a corresponding value for each respective radiomic feature in a respective class of radiomic features (e.g., block 202 of FIG. 2A, block 211 of FIG. 2A), providing a plurality of component predictions (e.g., block 212 of FIG. 2B), combining the plurality of component predictions (e.g., block 2148 of FIG. 2M), assigning therapy to a subject (e.g., block 2180 of FIG. 2O), or a combination thereof. In some embodiments, each respective model of the present disclosure makes use of 10 or more parameters, 100 or more parameters, 1000 or more parameters, 10,000 or more parameters, or 100,000 or more parameters. In some embodiments, each respective model of the present disclosure cannot be mentally performed.

Referring to block 238, in some embodiments, each respective component model in the plurality of component models comprises a respective neural network (e.g., a convolutional neural network and/or a residual neural network). Neural network algorithms, also known as artificial neural networks (ANNs), include convolutional and/or residual neural network algorithms (deep learning algorithms). Neural networks can be machine learning algorithms that may be trained to map an input data set to an output data set, where the neural network includes an interconnected group of nodes organized into multiple layers of nodes. For example, the neural network architecture may include at least an input layer, one or more hidden layers, and an output layer. The neural network may include any total number of layers, and any number of hidden layers, where the hidden layers function as trainable feature extractors that allow mapping of a set of input data to an output value or set of output values. As used herein, a deep learning algorithm (DNN) can be a neural network comprising a plurality of hidden layers, e.g., two or more hidden layers. Each layer of the neural network can include a number of nodes (or "neurons"). A node can receive input that comes either directly from the input data or the output of nodes in previous layers, and perform a specific operation, e.g., a summation operation. In some embodiments, a connection from an input to a node is associated with a parameter (e.g., a weight and/or weighting factor). In some embodiments, the node may sum up the products of all pairs of inputs, $x_i$, and their associated parameters. In some embodiments, the weighted sum is offset with a bias, b. In some embodiments, the output of a node or neuron may be gated using a threshold or activation function, f, which may be a linear or non-linear function. The activation function may be, for example, a rectified linear unit (ReLU) activation function, a Leaky ReLU activation function, or other function such as a saturating hyperbolic tangent, identity, binary step, logistic, arcTan, softsign, parametric rectified linear unit, exponential linear unit, softPlus, bent identity, softExponential, Sinusoid, Sine, Gaussian, or sigmoid function, or any combination thereof.

The weighting factors, bias values, and threshold values, or other computational parameters of the neural network, may be "taught" or "learned" in a training phase using one or more sets of training data. For example, the parameters may be trained using the input data from a training data set and a gradient descent or backward propagation method so that the output value(s) that the ANN computes are consistent with the examples included in the training data set. The parameters may be obtained from a back propagation neural network training process.

Any of a variety of neural networks may be suitable for use in performing the methods disclosed herein. Examples can include, but are not limited to, feedforward neural networks, radial basis function networks, recurrent neural networks, residual neural networks, convolutional neural networks, residual convolutional neural networks, and the like, or any combination thereof. In some embodiments, the machine learning makes use of a pre-trained and/or transfer-learned ANN or deep learning architecture. Convolutional and/or residual neural networks can be used for analyzing an image of a subject in accordance with the present disclosure.

For instance, a deep neural network model includes an input layer, a plurality of individually parameterized (e.g., weighted) convolutional layers, and an output scorer. The parameters (e.g., weights) of each of the convolutional layers as well as the input layer contribute to the plurality of parameters (e.g., weights) associated with the deep neural network model. In some embodiments, at least 100 parameters, at least 1000 parameters, at least 2000 parameters or at least 5000 parameters are associated with the deep neural network model. As such, deep neural network models require a computer to be used because they cannot be mentally solved. In other words, given an input to the model, the model output needs to be determined using a computer rather than mentally in such embodiments. See, for example, Krizhevsky et al., 2012, "Imagenet classification with deep convolutional neural networks," in Advances in Neural Information Processing Systems 2, Pereira, Burges, Bottou, Weinberger, eds., pp. 1097-1105, Curran Associates, Inc.; Zeiler, 2012 "ADADELTA: an adaptive learning rate method," CoRR, vol. abs/1212.5701; and Rumelhart et al., 1988, "Neurocomputing: Foundations of research," ch. Learning Representations by Back-propagating Errors, pp. 696-699, Cambridge, MA, USA: MIT Press, each of which is hereby incorporated by reference in its entirety for all purposes.

Neural network algorithms, including convolutional neural network algorithms, suitable for use as models are disclosed in, for example, Vincent et al., 2010, "Stacked denoising autoencoders: Learning useful representations in a deep network with a local denoising criterion," J Mach Learn Res 11, pp. 3371-3408; Larochelle et al., 2009, "Exploring strategies for training deep neural networks," J Mach Learn Res 10, pp. 1-40; and Hassoun, 1995, Fundamentals of Artificial Neural Networks, Massachusetts Institute of Technology, each of which is hereby incorporated by reference in its entirety for all purposes. Additional example neural networks suitable for use as models are disclosed in Duda et al., 2001, *Pattern Classification*, Second Edition, John Wiley & Sons, Inc., New York; and Hastie et al., 2001, *The Elements of Statistical Learning*, Springer-Verlag, New York, each of which is hereby incorporated by reference in its entirety for all purposes. Additional example neural networks suitable for use as models are also described in Draghici, 2003, *Data Analysis Tools for DNA Microarrays*, Chapman & Hall/CRC; and Mount, 2001, *Bioinformatics: sequence and genome analysis*, Cold Spring Harbor Laboratory Press, Cold Spring Harbor, New York, each of which is hereby incorporated by reference in its entirety for all purposes.

Referring to block 240, in some embodiments, each respective component model in the plurality of component models comprises a respective logistic regression model. Regression. In some embodiments, a component model performs a regression task. A regression task is any type of regression. For example, in some embodiments, the regression task is a logistic regression task. In some embodiments, the regression task is logistic regression with Lasso (L1), Ridge (L2) or elastic net regularization. In some embodiments, those extracted features that have a corresponding regression coefficient that fails to satisfy a threshold value are pruned (removed from) consideration. In other words, they are not included in the final trained regression model (e.g., a final trained component model). In some embodiments, a generalization of the logistic regression model that handles multicategory responses is used as a component model. For instance, rather than specifying absence or presence of a cancer condition, the component model can be a multicategory model that provides more granular detail on the cancer status, such as probability bins (e.g., bin 1:0-20% chance subject has the cancer condition, bin 2:20-40% chance the subject has the cancer condition, and so forth), or stages of cancer (e.g., bin 1: subject has no cancer, bin 2: subject has stage I cancer, bin 3: subject has stage II, and so forth). Logistic regression tasks are disclosed in Agresti, *An Introduction to Categorical Data Analysis*, 1996, Chapter 5, pp. 103-144, John Wiley & Son, New York, which is hereby incorporated by reference in its entirety for all purposes. In some embodiments, a component model of the present disclosure makes use of a regression task disclosed in Hastie et al., 2001, *The Elements of Statistical Learning*, Springer-Verlag, New York. In some embodiments, the logistic regression model includes at least 10, at least 20, at least 50, at least 100, or at least 1000 parameters (e.g., weights) and requires a computer to calculate because it cannot be mentally solved.

In some embodiments, the logistic regression model is a type I regression model. For instance, in some embodiments, the type I regression model is configured (e.g., trained) to have one or more independent parameters and one dependent parameter as input parameters. Accordingly, in some such embodiments, the type I regression model is configured to evaluate a variation of the one dependent parameter with respect to a change in a respective parameter in the one or more independent parameters. In some embodiments, the logistic regression model is a type II regression model. For instance, in some embodiments, the type II regression model is configured to have two or more dependent parameters. Accordingly, in some such embodiments, the type II regression model is configured to evaluate a variation of both a first dependent parameter and a second dependent parameter in the two or more dependent parameters with respect to a change in a third parameter, such as an unknown parameter. Additionally details and information regarding the logistic regression model is found at Legendre et al., 2018, "Package 'lmode2'," print, available at cran.r-project.org/web/packages/lmodel2/lmodel2.pdf (accessed Jul. 12, 2023), which is hereby incorporated by reference in its entirety for all purposes.

In FIG. 2E, referring to block 242, in some embodiments, the plurality of classes of radiomics features comprises the first subset of classes of radiomics features extracted from the unfiltered version of the plurality of medical images in the medical imaging dataset and the second subset of classes of radiomics features extracted from the filtered version of the plurality of medical images in the medical imaging dataset filtered by a first filtering methodology (e.g., via optional filter module 36).

Referring to block 244, in some embodiments, the first filtering methodology comprises an imaging filter selected from the group consisting of a wavelet transform filter, a Laplacian of Gaussian (LoG) filter, a square transform filter, a square root transform filter, a logarithm transform filter, an exponential transform filter, a gradient transform filter, a 2-dimensional local binary pattern filter, and a 3-dimensional local binary pattern filter.

For instance, in some embodiments, each respective imaging filter in the group consisting of the wavelet transform filter, the LoG filter, the square transform filter, the square root transform filter, the logarithm transform filter, the exponential transform filter, the gradient transform filter, the 2-dimensional local binary pattern filter, and the 3-dimensional local binary pattern filter is configured to generate a corresponding unique filtered version of a respective medial image that in accordance with a corresponding function associated with the respective imaging filter. For instance, in some embodiments, a respective imaging filter is configured to generate a filtered version of all or a portion of the plurality of medical images in accordance with a corresponding spatial-domain function that is applied to a respective medical image of the all or the portion of the plurality of medical images. In some embodiments, the respective imaging filter is configured to generate the filtered version of all or the portion of the plurality of medical images in accordance with a corresponding transform-domain function that is applied to the respective medical image of the all or the portion of the plurality of medical images. As a non-limiting example, in some embodiments, the logarithm transform filter is configured to generate a first corresponding unique filtered medical image that expands (e.g., enhances) values of dark pixels in accordance with a corresponding function that is applied to a first medical image. As another non-limiting example, in some embodiments, a first LoG filter is configured to generate a second corresponding unique filtered medical image that detects one or more points, one or more regions of interests, or one or more volumes of interests based on one or more derivative expressions in accordance with a corresponding function that is applied to the first medical image. As yet another non-limiting example, in some embodiments, a second LoG filter is configured to generate a third corresponding unique filtered medical image that detects one or more points, one or more regions of interests, or one or more volumes of interests based on one or more local intensity extrema in accordance with a corresponding function that is applied to the first medical image. Additional details and information regarding an imaging filter is found at Singh, P., 2019, "Feature enhanced Speckle Reduction in Ultrasound Images: Algorithms for Scan Modelling, Speckle Filtering, Texture Analysis and Feature Improvement," Doctoral dissertation, print; Bhoi, N, 2009, "Development of Some Novel Spatial-Domain and Transform-Domain Digital Image Filters," Doctoral dissertation, print; Cheng et al., 2003, "Computer-aided detection and classification of microcalcifications in mammograms: a survey," Pattern Recognition, 36 (12), pg. 2967-2991, each of which is hereby incorporated by reference in its entirety for all purposes.

Accordingly, in some embodiments, each respective imaging filter is configured to generate a unique filtered version of a respective medical image in the plurality of medical images of the medical dataset. Moreover, in some such embodiments, the filtered version of the respective medical image that is uniquely generated by the respective imaging filter is provided as input to each respective component model in the plurality of component models of the ensemble model, which allows for the ensemble model to process information that is richer in information in comparison to processing only the raw, unfiltered medical image.

Referring to block 246, in some embodiments, the first subset of classes of radiomics features comprises between 3 and 5 classes of radiomics features, between 3 and 4 classes of radiomic features, or between 4 and 5 classes of radiomic features. In some embodiments, the first subset of classes of radiomic features comprises at least 3, at least 4, or at least 5 classes of radiomics features. In some embodiments, the first subset of classes of radiomic features comprises at most 3, at most 4, or at most 5 classes of radiomics features.

In some embodiments, the second subset of classes of radiomics features comprises between 3 and 5 classes of radiomics features, between 3 and 4 classes of radiomic features, or between 4 and 5 classes of radiomic features. In some embodiments, the second subset of classes of radiomic features comprises at least 3, at least 4, or at least 5 classes of radiomics features. In some embodiments, the second subset of classes of radiomic features comprises at most 3, at most 4, or at most 5 classes of radiomics features.

Referring to block 248, in some embodiments, the first subset of classes of radiomics features comprises a class of radiomics features selected from the group consisting of shape features, first order features, gray level cooccurrence matrix (GLCM) features, gray level run length matrix (GLRLM) features, gray level size zone matrix (GLSZM), gray level dependence matrix (GLDM) features, and neighboring gray tone difference matrix (NGTDM) features.

Referring to block 250, in some embodiments, the first subset of classes of radiomics features comprises one or more shape features, one or more first order features, one or more gray level cooccurrence matrix (GLCM) features, one or more gray level run length matrix (GLRLM) features, one or more gray level size zone matrix (GLSZM), and one or more gray level dependence matrix (GLDM) features.

In some embodiments, each respective shape feature is configured to evaluate an n-dimensional (e.g., two-or three-dimensional) size and/or shape of a volume of interest or region of interest of a medical image.

In some embodiments, the shape features of the first subset of classes of radiomics features include some or all of the shape features listed in Table 1. For instance, in some embodiments, the shape features of the first subset of classes of radiomics features includes, or at least indicates, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, or all 44 of the shape features listed in Table 1.

In some embodiments, the shape features of the second subset of classes of radiomics features include some or all of the shape features listed in Table 1. For instance, in some embodiments, the shape features of the second subset of classes of radiomics features includes, or at least indicates, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, or all 44 of the shape features listed in Table 1.

TABLE 1

Example shape features.
Example Shape Features a mesh volume feature
a voxel volume feature
a surface area feature TABLE 1-continued Example shape features.
Example Shape Features a surface area to volume ratio feature
a three-dimensional (3 D) sphericity feature
a first compactness feature
a second compactness feature
a 3 D spherical disproportion feature
a maximum 3 D diameter feature
a first 3 D maximum two-dimensional (2 D) diameter (e.g., slice) feature
a second 3 D maximum 2 D diameter (e.g., column) feature
a third 3 D maximum 2 D diameter (e.g., row) feature
a 3 D major axis length feature
a 3 D minor axis length feature
a least axis length feature
a 3 D elongation feature
a flatness feature
a mesh surface feature
a pixel surface feature
a perimeter feature
a perimeter to surface ratio feature
a 2 D sphericity feature
a 2 D spherical disproportion feature
a first 2 D maximum 2 D diameter feature
a 2 D major axis length feature
a 2 D minor axis length feature
a 2 D elongation feature
a roundness feature
an eccentricity feature
an asphericity feature
a center of mass shift feature
a first volume density (e.g., axis-aligned bounding box) feature
a second volume density (e.g., oriented minimum bounding box) feature
a third volume density (e.g., approximate enclosing ellipsoid) feature
a fourth volume density (e.g., minimum volume enclosing ellipsoid) feature
a fifth volume density (e.g., convex hull) feature
a first area density (e.g., axis-aligned bounding box) feature
a second area density (e.g., oriented minimum bounding box) feature
a third area density (e.g., approximate enclosing ellipsoid) feature
a fourth area density (e.g., minimum volume enclosing ellipsoid) feature
a fifth area density (e.g., convex hull) feature
an integrated intensity feature
a Moran's I index feature
a Geary's C measure feature In some embodiments, each respective first order feature is configured to evaluate an intensity distribution within a region of interest or volume of interest of a medial image in accordance with a corresponding function.

In some embodiments, the first order features of the first subset of classes of radiomics features include some or all of the first order features listed in Table 2. For instance, in some embodiments, the first order features of the first subset of classes of radiomics features includes, or at least indicates, 1, 2, 3, 4, 5, 6, 7, 8, 9, 10, 11, 12, 13, 14, 15, 16, 17, 18, 19, 20, 21, 22, 23, 24, or all 25 of the first order features listed in Table 2.

In some embodiments, the first order features of the second subset of classes of radiomics features include some or all of the first order features listed in Table 2. For instance, in some embodiments, the first order features of the second subset of classes of radiomics features includes, or at least indicates, 1, 2, 3, 4, 5, 6, 7, 8, 9, 10, 11, 12, 13, 14, 15, 16, 17, 18, 19, 20, 21, 22, 23, 24, or all 25 of the first order features listed in Table 2.

TABLE 2

Example first order features.
Example First Order Features an energy feature
a total energy feature TABLE 2-continued Example first order features.
Example First Order Features an entropy feature
a minimum feature
a $10^{th}$ percentile feature
a $90^{th}$ percentile feature
a maximum feature
a mean feature
a median feature
an interquartile range feature
a range feature
a mean absolute deviation feature
a robust mean absolute deviation feature
a median absolute deviation feature
a root mean square feature
a standard deviation feature
a skewness feature
a variance feature
a kurtosis feature
a bin frequency feature
a local binary pattern (e.g., radius neighborhood) feature
a local peak feature
a global peak feature
a coefficient of variation feature
a quartile coefficient of dispersion feature In some embodiments, each respective GLCM feature is configured to evaluate a second-order joint probability function of a region of interest or volume of interest of a medial image in accordance with a corresponding function.

In some embodiments, the GLCM features of the first subset of classes of radiomics features include some or all of the GLCM features listed in Table 3. For instance, in some embodiments, the GLCM features of the first subset of classes of radiomics features includes, or at least indicates, 1, 2, 3, 4, 5, 6, 7, 8, 9, 10, 11, 12, 13, 14, 15, 16, 17, 18, 19, 20, 21, 22, 23, 24, 25, 26, 27, 28, 29, or all 30 of the GLCM features listed in Table 3.

In some embodiments, the GLCM features of the second subset of classes of radiomics features include some or all of the GLCM features listed in Table 3. For instance, in some embodiments, the GLCM features of the second subset of classes of radiomics features includes, or at least indicates, 1, 2, 3, 4, 5, 6, 7, 8, 9, 10, 11, 12, 13, 14, 15, 16, 17, 18, 19, 20, 21, 22, 23, 24, 25, 26, 27, 28, 29, or all 30 of the GLCM features listed in Table 3.

TABLE 3

Example GLCM features.
Example GLCM Features an autocorrelation feature
a joint average feature
a cluster prominence feature
a cluster shade feature
a cluster tendency feature
a contrast (e.g., inertia) feature
a correlation feature
a difference average feature
a difference entropy feature
a difference variance feature
a joint energy feature
a joint entropy feature
a first informational measure of correlation (IMC1) feature
a second informational measure of correlation (IMC2) feature
an inverse difference moment (e.g., homogeneity) feature
a maximal correlation coefficient feature
an inverse difference moment normalized feature
an inverse difference feature
an inverse difference normalized feature
an inverse variance feature
a maximum probability feature
a sum average feature
a sum entropy feature
a sum of squares feature
an energy (e.g., angular second moment) feature
a variance feature
a joint variance feature
a joint maximum feature
a sum variance feature
a dissimilarity feature In some embodiments, each respective GLSZM feature is configured to evaluate one or more gray level zones, or gray level areas, of a medial image in accordance with a corresponding function.

In some embodiments, the GLSZM features of the first subset of classes of radiomics features include some or all of the GLSZM features listed in Table 4. For instance, in some embodiments, the GLSZM features of the first subset of classes of radiomics features includes, or at least indicates, 1, 2, 3, 4, 5, 6, 7, 8, 9, 10, 11, 12, 13, 14, 15, or all 16 of the GLSZM features listed in Table 4.

In some embodiments, the GLSZM features of the second subset of classes of radiomics features include some or all of the GLSZM features listed in Table 4. For instance, in some embodiments, the GLSZM features of the second subset of classes of radiomics features includes, or at least indicates, 1, 2, 3, 4, 5, 6, 7, 8, 9, 10, 11, 12, 13, 14, 15, or all 16 of the GLSZM features listed in Table 4.

TABLE 4

Example GLSZM features, where the terms "zone" and "area" are used interchangeably.
Example GLSZM Features a small area emphasis feature
a large area emphasis feature
a gray level non-uniformity (GLN) feature
a GLN normalized feature
a size-zone non-uniformity (SZN) feature
a SZN normalized feature
a zone percentage feature
a gray level variance feature
a zone variance (e.g., zone size variance) feature
a zone entropy (e.g., zone size entropy) feature
a low gray level zone emphasis feature
a high gray level zone emphasis feature
a small area low gray level emphasis feature
a small area high gray level emphasis feature
a large area low gray level emphasis feature
a large area high gray level emphasis feature In some embodiments, each respective GLRLM feature is configured to evaluate a gray run level, which is a length of a number of pixels of consecutive pixels that have a first gray level value for a medial image in accordance with a corresponding function.

In some embodiments, the GLRLM features of the first subset of classes of radiomics features include some or all of the GLRLM features listed in Table 5. For instance, in some embodiments, the GLRLM features of the first subset of classes of radiomics features includes, or at least indicates, 1, 2, 3, 4, 5, 6, 7, 8, 9, 10, 11, 12, 13, 14, 15, or all 16 of the GLRLM features listed in Table 5.

In some embodiments, the GLRLM features of the second subset of classes of radiomics features include some or all of the GLRLM features listed in Table 5. For instance, in some embodiments, the GLRLM features of the second subset of classes of radiomics features includes, or at least indicates, 1, 2, 3, 4, 5, 6, 7, 8, 9, 10, 11, 12, 13, 14, 15, or all 16 of the GLRLM features listed in Table 5.

TABLE 5

Example GLRLM features.
Example GLRLM Features a short run emphasis (SRE) feature
a long run emphasis (LRE) feature
a gray level non-uniformity (GLN) feature
a GLN normalized (GLNN) feature
a run length non-uniformity (RLN) feature
a RLN normalized (RLNN) feature
a run percentage (RP) feature
a gray level variance (GLV) feature
a run variance (e.g., run length variance) feature
a run entropy feature
a low gray level run emphasis (LGLRE) feature
a high gray level run emphasis (HGLRE) feature
a short run low gray level emphasis (SRLGLE) feature
a short run high gray level emphasis (SRHGLE) feature
a long run low gray level emphasis (LRLGLE) feature
a long run high gray level emphasis (LRHGLE) feature In some embodiments, each respective GLDM feature is configured to evaluate gray level dependencies of a medial image in accordance with a corresponding function.

In some embodiments, the GLDM features of the first subset of classes of radiomics features include some or all of the GLDM features listed in Table 6. For instance, in some embodiments, the GLDM features of the first subset of classes of radiomics features includes, or at least indicates, 1, 2, 3, 4, 5, 6, 7, 8, 9, 10, 11, 12, 13, or all 14 of the GLDM features listed in Table 6.

In some embodiments, the GLDM features of the second subset of classes of radiomics features include some or all of the GLDM features listed in Table 6. For instance, in some embodiments, the GLDM features of the second subset of classes of radiomics features includes, or at least indicates, 1, 2, 3, 4, 5, 6, 7, 8, 9, 10, 11, 12, 13, or all 14 of the GLDM features listed in Table 6.

TABLE 6

Example GLDM features.
Example GLDM Features a small dependence emphasis feature
a large dependence emphasis feature
a gray level non-uniformity (GLN) feature
a dependence non-uniformity (DN) feature
a DN normalized (DNN) feature
a gray level variance feature
a dependence variance feature
a dependence entropy feature
a low gray level emphasis feature
a high gray level emphasis feature
a small dependence low gray level emphasis feature
a small dependence high gray level emphasis feature
a large dependence low gray level emphasis feature
a large dependence high gray level emphasis feature In some embodiments, each respective NGTDM feature is configured to evaluate a difference between a gray value and an average gray value that neighbours the gray value within a first distance of a medial image in accordance with a corresponding function.

In some embodiments, the NGTDM features of the first subset of classes of radiomics features include some or all of the NGTDM features listed in Table 7. For instance, in some embodiments, the NGTDM features of the first subset of classes of radiomics features includes, or at least indicates, 1, 2, 3, 4, or all 5 of the NGTDM features listed in Table 7.

In some embodiments, the NGTDM features of the second subset of classes of radiomics features include some or all of the NGTDM features listed in Table 7. For instance, in some embodiments, the NGTDM features of the second subset of classes of radiomics features includes, or at least indicates, 1, 2, 3, 4, or all 5 of the NGTDM features listed in Table 7.

TABLE 7

Example NGTDM features.
Example NGTDM Features a coarseness feature
a contrast feature
a busyness feature
a complexity feature
a strength feature In some embodiments, the first subset of classes of radiomics features include some or all features listed in Table 1, Table 2, Table 3, Table 4, Table 5, Table 6, Table 7, or a combination thereof. For instance, in some embodiments, the first subset of classes of radiomics features includes, or at least indicates, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, or all 150 of the features listed in Table 1, Table 2, Table 3, Table 4, Table 5, Table 6, Table 7, or the combination thereof.

In some embodiments, the second subset of classes of radiomics features include some or all features listed in Table 1, Table 2, Table 3, Table 4, Table 5, Table 6, Table 7, or a combination thereof. For instance, in some embodiments, the second subset of classes of radiomics features includes, or at least indicates, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, or all 150 of the features listed in Table 1, Table 2, Table 3, Table 4, Table 5, Table 6, Table 7, or the combination thereof.

Additional details and information regarding the plurality of classes of radiomic feature is found at van Griethuysen et al., 2017, "Computational Radiomics System to Decode the Radiographic Phenotype," Cancer Research, 77(21), pg. e104-e107; Pyradiomics Community, "Radiomic Features," available at pyradiomics.readthedocs.io/en/latest/features.html # (accessed Jul. 12, 2023); Davatziko et al., 2018, "Cancer Imaging Phenomics Toolkit: Quantitative Imaging Analytics for Precision Diagnostics and Predictive Modeling of Clinical Outcome," J. Med. Imaging, 5(1), pg. 011018; Pati et al., 2019, "The Cancer Imaging Phenomics Toolkit (CaPTk): Technical Overview," BrainLes, Springer LNCS, (11993), pg. 380-394; University of Pennsylvania, Center for Biomedical Image Computing & Analytics, "Cancer Imaging Phenomics Toolkit," available at cbica.github.io/CaPTk/tr_Apps.html #appsFeatures (accessed Jul. 12, 2023); Ashrafinia, S., 2019, "Quantitative Nuclear Medicine Imaging using Advanced Image Reconstruction and Radiomics", Ph.D. Dissertation, Johns Hopkins University, print; Zwanenburg et al., 2017, "Image Biomarker Standardisation Initative," arXiv preprint arXiv: 1612.07003; Standardized Environment for Radiomics Analysis (SERA), 2019, "SERA Feature Names and Benchmarks," available at github.com/ashrafinia/SERA/tree/master/Feature%20Names%20and%20Benchmarks (accessed Jul. 12, 2023), each of which is hereby incorporated by reference in its entirety for all purposes.

Referring to block 252, in some embodiments, each respective class of radiomics features in the first subset of classes of radiomics features comprises at least 10, at least 25, at least 50, at least 100, or at least 250 corresponding radiomics features.

Referring to block 254, in some embodiments, each respective class of radiomics features in the first subset of classes of radiomics features comprises no more than 1,000, no more than 750, no more than 500, no more than 250, or no more than 100 corresponding radiomics features.

In some embodiments, each respective class of radiomics features in the first subset of classes of radiomics features comprises between 10 and 1,000 corresponding radiomics features, between 10 and 750 corresponding radiomics features, between 10 and 500 corresponding radiomics features, between 10 and 250 corresponding radiomics features, between 10 and 100 corresponding radiomics features, between 10 and 50 corresponding radiomics features, between 75 and 750 corresponding radiomics features, between 75 and 500 corresponding radiomics features, between 75 and 250 corresponding radiomics features, between 75 and 100 corresponding radiomics features, between 175 and 750 corresponding radiomics features, between 175 and 500 corresponding radiomics features, between 175 and 250 corresponding radiomics features, between 375 and 750 corresponding radiomics features, between 375 and 500 corresponding radiomics features, or between 600 and 750 corresponding radiomic features.

In FIG. 2F, referring to block 256, in some embodiments, the plurality of classes of radiomics features comprises a subset of classes of radiomics features extracted from a version of the plurality of medical images filtered using a first wavelet transform filter.

Referring to block 258, in some embodiments, the subset of classes of radiomics features extracted from the version of the plurality of medical images filtered using the first wavelet transform filter comprises between 3 and 5 classes of radiomics features, between 3 and 4 classes of radiomic features, or between 4 and 5 classes of radiomic features. In some embodiments, the subset of classes of radiomics features extracted from the version of the plurality of medical images filtered using the first wavelet transform filter comprises at least 3, at least 4, or at least 5 classes of radiomics features. In some embodiments, the subset of classes of radiomics features extracted from the version of the plurality of medical images filtered using the first wavelet transform filter comprises at most 3, at most 4, or at most 5 classes of radiomics features.

Referring to block 260, in some embodiments, the subset of classes of radiomics features extracted from the version of the plurality of medical images filtered using the first wavelet transform filter comprises a class of radiomics features selected from the group consisting of first order features, gray level cooccurrence matrix (GLCM) features, gray level run length matrix (GLRLM) features, gray level size zone matrix (GLSZM), gray level dependence matrix (GLDM) features, and neighboring gray tone difference matrix (NGTDM) features.

Referring to block 262, in some embodiments, the subset of classes of radiomics features extracted from the version of the plurality of medical images filtered using the first wavelet transform filter comprises first order features, gray level cooccurrence matrix (GLCM) features, gray level run length matrix (GLRLM) features, gray level size zone matrix (GLSZM), and gray level dependence matrix (GLDM) features.

Referring to block 264, in some embodiments, each respective class of radiomics features in the subset of classes of radiomics features extracted from the version of the plurality of medical images filtered using the first wavelet transform filter comprises at least 10, at least 25, at least 50, at least 100, or at least 250 corresponding radiomics features.

Referring to block 266, in some embodiments, each respective class of radiomics features in the subset of classes of radiomics features extracted from the version of the plurality of medical images filtered using the first wavelet transform filter comprises no more than 1000, no more than 750, no more than 500, no more than 250, or no more than 100 corresponding radiomics features.

In some embodiments, each respective class of radiomics features in the subset of classes of radiomics features extracted from the version of the plurality of medical images filtered using the first wavelet transform filter comprises between 10 and 1,000 corresponding radiomics features, between 10 and 750 corresponding radiomics features, between 10 and 500 corresponding radiomics features, between 10 and 250 corresponding radiomics features, between 10 and 100 corresponding radiomics features, between 10 and 50 corresponding radiomics features, between 75 and 750 corresponding radiomics features, between 75 and 500 corresponding radiomics features, between 75 and 250 corresponding radiomics features, between 75 and 100 corresponding radiomics features, between 175 and 750 corresponding radiomics features, between 175 and 500 corresponding radiomics features, between 175 and 250 corresponding radiomics features, between 375 and 750 corresponding radiomics features, between 375 and 500 corresponding radiomics features, or between 600 and 750 corresponding radiomic features.

In FIG. 2G, referring to block 268, in some embodiments, the plurality of classes of radiomics features comprises a subset of classes of radiomics features extracted from a version of the plurality of medical images filtered using a second wavelet transform filter.

Referring to block 270, in some embodiments, the subset of classes of radiomics features extracted from the version of the plurality of medical images filtered using the second wavelet transform filter comprises between 3 and 5 radiomics features, between 3 and 4 features, or between 4 and 5 radiomic features. In some embodiments, the subset of classes of radiomics features extracted from the version of the plurality of medical images filtered using the second wavelet transform filter comprises at least 3, at least 4, or at least 5 radiomics features. In some embodiments, the subset of classes of radiomics features extracted from the version of the plurality of medical images filtered using the second wavelet transform filter comprises at most 3, at most 4, or at most 5 radiomics features.

Referring to block 272, in some embodiments, the subset of classes of radiomics features extracted from the version of the plurality of medical images filtered using the second wavelet transform filter comprises a class of radiomics features selected from the group consisting of first order features, gray level cooccurrence matrix (GLCM) features, gray level run length matrix (GLRLM) features, gray level size zone matrix (GLSZM), gray level dependence matrix (GLDM) features, and neighboring gray tone difference matrix (NGTDM) features.

Referring to block 274, in some embodiments, the subset of classes of radiomics features extracted from the version of the plurality of medical images filtered using the second wavelet transform filter comprises first order features, gray level cooccurrence matrix (GLCM) features, gray level run length matrix (GLRLM) features, gray level size zone matrix (GLSZM), and gray level dependence matrix (GLDM) features.

Referring to block 276, in some embodiments, each respective class of radiomics features in the subset of classes of radiomics features extracted from the version of the plurality of medical images filtered using the second wavelet transform filter comprises at least 10, at least 25, at least 50, at least 100, or at least 250 corresponding radiomics features.

Referring to block 278, in some embodiments, each respective class of radiomics features in the subset of classes of radiomics features extracted from the version of the plurality of medical images filtered using the second wavelet transform filter comprises no more than 1000, no more than 750, no more than 500, no more than 250, or no more than 100 corresponding radiomics features.

In some embodiments, each respective class of radiomics features in the subset of classes of radiomics features extracted from the version of the plurality of medical images filtered using the second wavelet transform filter comprises between 10 and 1,000 corresponding radiomics features, between 10 and 750 corresponding radiomics features, between 10 and 500 corresponding radiomics features, between 10 and 250 corresponding radiomics features, between 10 and 100 corresponding radiomics features, between 10 and 50 corresponding radiomics features, between 75 and 750 corresponding radiomics features, between 75 and 500 corresponding radiomics features, between 75 and 250 corresponding radiomics features, between 75 and 100 corresponding radiomics features, between 175 and 750 corresponding radiomics features, between 175 and 500 corresponding radiomics features, between 175 and 250 corresponding radiomics features, between 375 and 750 corresponding radiomics features, between 375 and 500 corresponding radiomics features, or between 600 and 750 corresponding radiomic features.

In FIG. 2H, referring to block 280, in some embodiments, the plurality of classes of radiomics features comprises a subset of classes of radiomics features extracted from a version of the plurality of medical images filtered using a LoG filter.

Referring to block 282, in some embodiments, the subset of classes of radiomics features extracted from the version of the plurality of medical images filtered using the LoG filter comprises between 3 and 5 classes of radiomics features, between 3 and 4 classes of radiomic features, or between 4 and 5 classes of radiomic features. In some embodiments, the subset of classes of radiomics features extracted from the version of the plurality of medical images filtered using the LoG filter comprises at least 3, at least 4, or at least 5 classes of radiomics features. In some embodiments, the subset of classes of radiomics features extracted from the version of the plurality of medical images filtered using the LoG filter comprises at most 3, at most 4, or at most 5 classes of radiomics features.

Referring to block 284, in some embodiments, the subset of classes of radiomics features extracted from the version of the plurality of medical images filtered using the LoG filter comprises a class of radiomics features selected from the group consisting of first order features, gray level cooccurrence matrix (GLCM) features, gray level run length matrix (GLRLM) features, gray level size zone matrix (GLSZM), gray level dependence matrix (GLDM) features, and neighboring gray tone difference matrix (NGTDM) features.

Referring to block 286, in some embodiments, the subset of classes of radiomics features extracted from the version of the plurality of medical images filtered using the LoG filter comprises first order features, gray level cooccurrence matrix (GLCM) features, gray level run length matrix (GLRLM) features, gray level size zone matrix (GLSZM), and gray level dependence matrix (GLDM) features.

Referring to block 288, in some embodiments, each respective class of radiomics features in the subset of classes of radiomics features extracted from the version of the plurality of medical images filtered using the LoG filter comprises at least 10, at least 25, at least 50, at least 100, or at least 250 corresponding radiomics features.

Referring to block 290, in some embodiments, each respective class of radiomics features in the subset of classes of radiomics features extracted from the version of the plurality of medical images filtered using the LoG filter comprises no more than 1000, no more than 750, no more than 500, no more than 250, or no more than 100 corresponding radiomics features.

In some embodiments, each respective class of radiomics features in the subset of classes of radiomics features extracted from the version of the plurality of medical images filtered using the LoG filter comprises between 10 and 1,000 corresponding radiomics features, between 10 and 750 corresponding radiomics features, between 10 and 500 corresponding radiomics features, between 10 and 250 corresponding radiomics features, between 10 and 100 corresponding radiomics features, between 10 and 50 corresponding radiomics features, between 75 and 750 corresponding radiomics features, between 75 and 500 corresponding radiomics features, between 75 and 250 corresponding radiomics features, between 75 and 100 corresponding radiomics features, between 175 and 750 corresponding radiomics features, between 175 and 500 corresponding radiomics features, between 175 and 250 corresponding radiomics features, between 375 and 750 corresponding radiomics features, between 375 and 500 corresponding radiomics features, or between 600 and 750 corresponding radiomic features.

In FIG. 2I, referring to block 292, in some embodiments, the plurality of classes of radiomics features comprises a subset of classes of radiomics features extracted from a version of the plurality of medical images filtered using a logarithm transform filter.

Referring to block 294, in some embodiments, the subset of classes of radiomics features extracted from the version of the plurality of medical images filtered using the logarithm transform filter comprises between 3 and 5 classes of radiomics features, between 3 and 4 classes of radiomic features, or between 4 and 5 classes of radiomic features. In some embodiments, the subset of classes of radiomics features extracted from the version of the plurality of medical images filtered using the logarithm transform filter comprises at least 3, at least 4, or at least 5 classes of radiomics features. In some embodiments, the subset of classes of radiomics features extracted from the version of the plurality of medical images filtered using the logarithm transform filter comprises at most 3, at most 4, or at most 5 classes of radiomics features.

Referring to block 296, in some embodiments, the subset of classes of radiomics features extracted from the version of the plurality of medical images filtered using the logarithm transform filter comprises a class of radiomics features selected from the group consisting of first order features, gray level cooccurrence matrix (GLCM) features, gray level run length matrix (GLRLM) features, gray level size zone matrix (GLSZM), gray level dependence matrix (GLDM) features, and neighboring gray tone difference matrix (NGTDM) features.

Referring to block 298, in some embodiments, the subset of classes of radiomics features extracted from the version of the plurality of medical images filtered using the logarithm transform filter comprises first order features, gray level cooccurrence matrix (GLCM) features, gray level run length matrix (GLRLM) features, gray level size zone matrix (GLSZM), and gray level dependence matrix (GLDM) features.

Referring to block 2100, in some embodiments, each respective class of radiomics features in the subset of classes of radiomics features extracted from the version of the plurality of medical images filtered using the logarithm transform filter comprises at least 10, at least 25, at least 50, at least 100, or at least 250 corresponding radiomics features.

Referring to block 2102, in some embodiments, each respective class of radiomics features in the subset of classes of radiomics features extracted from the version of the plurality of medical images filtered using the logarithm transform filter comprises no more than 1000, no more than 750, no more than 500, no more than 250, or no more than 100 corresponding radiomics features.

In some embodiments, each respective class of radiomics features in the subset of classes of radiomics features extracted from the version of the plurality of medical images filtered using the logarithm transform filter comprises between 10 and 1,000 corresponding radiomics features, between 10 and 750 corresponding radiomics features, between 10 and 500 corresponding radiomics features, between 10 and 250 corresponding radiomics features, between 10 and 100 corresponding radiomics features, between 10 and 50 corresponding radiomics features, between 75 and 750 corresponding radiomics features, between 75 and 500 corresponding radiomics features, between 75 and 250 corresponding radiomics features, between 75 and 100 corresponding radiomics features, between 175 and 750 corresponding radiomics features, between 175 and 500 corresponding radiomics features, between 175 and 250 corresponding radiomics features, between 375 and 750 corresponding radiomics features, between 375 and 500 corresponding radiomics features, or between 600 and 750 corresponding radiomic features.

In FIG. 2J, referring to block 2104, in some embodiments, the plurality of classes of radiomics features comprises a subset of classes of radiomics features extracted from a version of the plurality of medical images filtered using an exponential transform filter.

Referring to block 2106, in some embodiments, the subset of classes of radiomics features extracted from the version of the plurality of medical images filtered using the exponential transform filter comprises between 3 and 5 classes of radiomics features, between 3 and 4 classes of radiomic features, or between 4 and 5 classes of radiomic features. In some embodiments, the subset of classes of radiomics features extracted from the version of the plurality of medical images filtered using the exponential transform filter comprises at least 3, at least 4, or at least 5 classes of radiomics features. In some embodiments, the subset of classes of radiomics features extracted from the version of the plurality of medical images filtered using the exponential transform filter comprises at most 3, at most 4, or at most 5 classes of radiomics features.

Referring to block 2108, in some embodiments, the subset of classes of radiomics features extracted from the version of the plurality of medical images filtered using the exponential transform filter comprises a class of radiomics features selected from the group consisting of first order features, gray level cooccurrence matrix (GLCM) features, gray level run length matrix (GLRLM) features, gray level size zone matrix (GLSZM), gray level dependence matrix (GLDM) features, and neighboring gray tone difference matrix (NGTDM) features.

Referring to block 2110, in some embodiments, the subset of classes of radiomics features extracted from the version of the plurality of medical images filtered using the exponential transform filter comprises first order features, gray level cooccurrence matrix (GLCM) features, gray level run length matrix (GLRLM) features, gray level size zone matrix (GLSZM), and gray level dependence matrix (GLDM) features.

Referring to block 2112, in some embodiments, each respective class of radiomics features in the subset of classes of radiomics features extracted from the version of the plurality of medical images filtered using the exponential transform filter comprises at least 10, at least 25, at least 50, at least 100, or at least 250 corresponding radiomics features.

Referring to block 2114, in some embodiments, each respective class of radiomics features in the subset of classes of radiomics features extracted from the version of the plurality of medical images filtered using the exponential transform filter comprises no more than 1000, no more than 750, no more than 500, no more than 250, or no more than 100 corresponding radiomics features.

In some embodiments, each respective class of radiomics features in the subset of classes of radiomics features extracted from the version of the plurality of medical images filtered using the exponential transform filter comprises between 10 and 1,000 corresponding radiomics features, between 10 and 750 corresponding radiomics features, between 10 and 500 corresponding radiomics features, between 10 and 250 corresponding radiomics features, between 10 and 100 corresponding radiomics features, between 10 and 50 corresponding radiomics features, between 75 and 750 corresponding radiomics features, between 75 and 500 corresponding radiomics features, between 75 and 250 corresponding radiomics features, between 75 and 100 corresponding radiomics features, between 175 and 750 corresponding radiomics features, between 175 and 500 corresponding radiomics features, between 175 and 250 corresponding radiomics features, between 375 and 750 corresponding radiomics features, between 375 and 500 corresponding radiomics features, or between 600 and 750 corresponding radiomic features.

With continued reference to FIG. 2K, in block 2116, in some embodiments, the plurality of classes of radiomics features comprises a subset of classes of radiomics features extracted from a version of the plurality of medical images filtered using a square transform filter.

Referring to block 2118, in some embodiments, the subset of classes of radiomics features extracted from the version of the plurality of medical images filtered using the square transform filter comprises between 3 and 5 classes of radiomics features, between 3 and 4 classes of radiomic features, or between 4 and 5 classes of radiomic features. In some embodiments, the subset of classes of radiomics features extracted from the version of the plurality of medical images filtered using the square transform filter comprises at least 3, at least 4, or at least 5 classes of radiomics features. In some embodiments, the subset of classes of radiomics features extracted from the version of the plurality of medical images filtered using the square transform filter comprises at most 3, at most 4, or at most 5 classes of radiomics features.

Referring to block 2120, in some embodiments, the subset of classes of radiomics features extracted from the version of the plurality of medical images filtered using the square transform filter comprises a class of radiomics features selected from the group consisting of first order features, gray level cooccurrence matrix (GLCM) features, gray level run length matrix (GLRLM) features, gray level size zone matrix (GLSZM), gray level dependence matrix (GLDM) features, and neighboring gray tone difference matrix (NGTDM) features.

Referring to block 2122, in some embodiments, the subset of classes of radiomics features extracted from the version of the plurality of medical images filtered using the square transform filter comprises first order features, gray level cooccurrence matrix (GLCM) features, gray level run length matrix (GLRLM) features, gray level size zone matrix (GLSZM), and gray level dependence matrix (GLDM) features.

Referring to block 2124, in some embodiments, each respective class of radiomics features in the subset of classes of radiomics features extracted from the version of the plurality of medical images filtered using the square transform filter comprises at least 10, at least 25, at least 50, at least 100, or at least 250 corresponding radiomics features.

Referring to block 2126, in some embodiments, each respective class of radiomics features in the subset of classes of radiomics features extracted from the version of the plurality of medical images filtered using the square transform filter comprises no more than 1000, no more than 750, no more than 500, no more than 250, or no more than 100 corresponding radiomics features.

In some embodiments, each respective class of radiomics features in the subset of classes of radiomics features extracted from the version of the plurality of medical images filtered using the square transform filter comprises between 10 and 1,000 corresponding radiomics features, between 10 and 750 corresponding radiomics features, between 10 and 500 corresponding radiomics features, between 10 and 250 corresponding radiomics features, between 10 and 100 corresponding radiomics features, between 10 and 50 corresponding radiomics features, between 75 and 750 corresponding radiomics features, between 75 and 500 corresponding radiomics features, between 75 and 250 corresponding radiomics features, between 75 and 100 corresponding radiomics features, between 175 and 750 corresponding radiomics features, between 175 and 500 corresponding radiomics features, between 175 and 250 corresponding radiomics features, between 375 and 750 corresponding radiomics features, between 375 and 500 corresponding radiomics features, or between 600 and 750 corresponding radiomic features.

With continued reference to block 2128 in FIG. 2L, in some embodiments, the plurality of classes of radiomics features comprises a class of local binary pattern (LBP) features.

Referring to block 2130, in some embodiments, the plurality of classes of radiomics features comprises a class of local ternary pattern (LTP) features.

Referring to block 2132, in some embodiments, the plurality of classes of radiomics features comprises a class of upper LTP features.

Referring to block 2134, in some embodiments, the plurality of classes of radiomics features comprises a class of lower LTP features.

Referring to block 2136, in some embodiments, the plurality of classes of radiomics features comprises a class of latent features.

Referring to block 2138, in some embodiments, respective latent features in the class of latent features are extracted from a segmentation model. For example, in some embodiments, the respective latent features in the class of latent features are derived from encodings from a layer (e.g., the bottle neck layer) of the segmentation model.

Referring to block 2140, in some embodiments, the medical imaging dataset comprises a computerized tomography (CT) dataset, a magnetic resonance imaging (MRI) dataset, an ultrasound dataset, a position emission tomography (PET) dataset, or an X-ray dataset.

Referring to block 2142, in some embodiments, the medical imaging dataset comprises a brain MRI dataset.

Referring to block 2144, in some embodiments, the medical imaging dataset comprises a whole-body PET dataset.

Referring to block 2146, in some embodiments, the medical imaging dataset comprises a lung CT.

In FIG. 2M, referring to block 2148, in some embodiments, the method includes combining the plurality of component predictions to obtain as output of the ensemble model a characterization of the cancer condition.

Referring to block 2150, in some embodiments, the characterization of the cancer condition comprises: a respective cancer type selected from a plurality of cancer types, a respective cancer stage selected from a plurality of cancer stages, a respective tissue of origin selected from a plurality of tissues of origin, a respective cancer grade selected from a plurality of cancer grades, or a respective prognosis selected from a plurality of prognoses. In some embodiments, cancer characteristics that can be distinguished using radiomics include genomic mutations, RNA expression, protein expression (e.g., immunohistochemistry status), cancer molecular/histopathological subtype, immune signatures, treatment response, treatment monitoring (e.g., leveraging longitudinal data and delta radiomics), tumor mass malignancy score, and adverse event risk (e.g., where the adverse event is death).

Referring to block 2152, in some embodiments, the characterization of the cancer condition comprises a respective tissue of origin selected from a plurality of tissues of origin.

Referring to block 2154, in some embodiments, the characterization of the cancer condition comprises a respective cancer grade selected from a plurality of cancer grades.

Referring to block 2156, in some embodiments, the characterization of the cancer condition comprises a respective cancer stage selected from a plurality of cancer stages.

Referring to block 2158, in some embodiments, the characterization of the cancer condition comprises a prognosis for the cancer condition selected from a plurality of prognoses.

Referring to block 2160, in some embodiments, the plurality of prognoses comprises a continuous range of prognoses.

Referring to block 2162, in some embodiments, the prognosis is a predicted survival time.

Referring to block 2164, in some embodiments, the predicted survival time is a cancer survival time, a disease-free survival time, or a progression-free survival time.

Referring to block 2166, in some embodiments, the predicted survival time is a cancer survival time for non-small cell lung cancer (NSCLC).

Referring to block 2168 in FIG. 2N, in some embodiments, the characterization of the cancer condition is a respective characterization selected from a plurality of discrete characterizations of the cancer condition. Each respective component prediction in the plurality of component predictions is a respective component characterization of the cancer condition selected from the plurality of discrete characterizations of the cancer condition. The combining comprises identifying the respective component characterization that is most represented in the plurality of component predictions, thereby obtaining the characterization of the cancer condition.

Referring to block 2170, in some embodiments, the characterization of the cancer condition is a respective characterization identified from a continuous range of characterizations of the cancer condition. Each respective component prediction in the plurality of component predictions is a respective component characterization of the cancer condition identified from the continuous range of characterizations. The combining comprises determining a measure of central tendency for the plurality of component predictions, thereby obtaining the characterization of the cancer condition.

Referring to block 2172, in some embodiments, the measure of central tendency for the plurality of component predictions is a weighted measure of central tendency.

Referring to block 2174, in some embodiments, the combining comprises inputting the plurality of component predictions for the cancer condition into an aggregation model to obtain as output of the aggregation model the characterization of the cancer condition.

Referring to block 2176, in some embodiments, the aggregation model is a neural network, a support vector machine, a Naive Bayes model, a nearest neighbor model, a boosted trees model, a random forests model, or a clustering model.

Referring to block 2178, in some embodiments, the aggregation model is a voting model with a tuned threshold.

With continued reference to FIG. 2O, and referring to block 2180, in some embodiments, the method includes assigning therapy to the subject for the cancer condition based on the characterization of the cancer condition. Referring to block 2182, in some embodiments, the cancer condition is non-small cell lung cancer (NSCLC). The therapy assigned to the subject is selected from the group consisting of surgery, radiation therapy, and immunotherapy.

Referring to block 2184, in some embodiments, the method includes administering therapy to the subject for the cancer condition based on the characterization of the cancer condition. Referring to block 2186, in some embodiments, the cancer condition is non-small cell lung cancer (NSCLC). The therapy administered to the subject is selected from the group consisting of surgery, radiation therapy, and immunotherapy.

In some embodiments, the ensemble model aims to provide clinicians and patients with more information (e.g., without assigning or administering therapy). The outputs are whether a patient is at high/low risk of dying while receiving standard of care treatments. Ultimately, the treatment to be prescribed is the decision of the clinician and can based on many (e.g., other) factors specific to the patient. Some hypothetical examples where the ensemble model disclosed herein may inspire a different course of action include: (i) a patient of a high-risk group may not wish to undergo treatments that will significantly lower the quality of their remaining life, such as an intense chemo therapy regimen; or (ii) a patient belonging to a high-risk group may imply standard treatments will not work, and the output of the ensemble model could suggest they seek out a clinical trial or have additional sequencing done to search for a novel immune-oncology (IO) therapy.

Example: Training of an Ensemble Model and the Comparison of the Performance of the Trained Ensemble Model to its Trained Component Models An ensemble model was trained to characterize a cancer condition of a tissue in a subject in accordance with the training process illustrated in FIG. 4. In this example, the full training dataset 402 consisted of images from 245 non-small cell lung cancer patients of their cancer, the majority of whom were treated with standard cancer therapies. The dependent variable/label used for training was whether the patients survived two years past their radiology scan. The output of the model was a prediction of whether the patient was expected to survive more than two years past their radiology scan, independent of treatment. This was interpreted as an assessment of whether the patient was high or low risk of experiencing an "event" (death). Patients who were not followed for at least two years and did not experience an event before the two-year time threshold were censored out of the analysis. Of the training cohort, 76 patients survived the required 730 days and 169 patients did not.

Each image volume (plurality of images) was loaded along with corresponding region of interest label files. These images were then transformed into multiple types before feature extraction for a total of ~2000 radiomic features calculated per region of interest (volume of interest, VOI). Features were only extracted from regions of interest made up of at least 5 voxels. The features were broken down into four categories, shape (16), intensity (18), texture (68) and filter (1892) features.

The 16 shape features represented the contour's shape, size, key diameters and overall sphericity (e.g., Mesh Volume, SurfaceArea, Surface VolumeRatio, Compactness1, and Compactness2).

The 18 intensity features were derived from the statistics of the ROI's voxel densities and included features such as the mean HU, the first and second orders of the density histogram, and features representing the uniformity of the density histogram.

The 68 texture features were extracted with the aim of capturing subtle changes and patterns in the three-dimensional ROI's densities using matrix mathematics.

The 68 texture features included 22 GLCM features, 16 GLRLM features, 16 GLSZM features, and 14 Gray Level Dependence Matrix (GLDM) features.

The 22 GLCM features were Autocorrelation, JointAverage, ClusterProminence, ClusterShade, ClusterTendency, Contrast, Correlation, DifferenceAverage, DifferenceEntropy, Difference Variance, JointEnergy, JointEntropy, Imc1, Imc2, Idm, Idmn, Id, Idn, InverseVariance, MaximumProbability, SumEntropy, and SumSquares.

The 16 Gray level run length matrix (GLRLM) features were GrayLevelNonUniformity, GrayLevelNonUniformityNormalized, GrayLevelVariance, HighGrayLevelRunEmphasis, LongRunEmphasis, LongRunHighGrayLevelEmphasis, LongRunLowGrayLevelEmphasis, LowGrayLevelRunEmphasis, RunEntropy, RunLengthNonUniformity, RunLengthNonUniformityNormalized, RunPercentage, RunVariance, ShortRunEmphasis, ShortRunHighGrayLevelEmphasis, and ShortRunLowGrayLevelEmphasis.

The 16 gray-level size zone matrix (GLSZM) features were GrayLevelNonUniformity, GrayLevelNonUniformityNormalized, GrayLevel Variance, HighGrayLevelZoneEmphasis, LargeAreaEmphasis, LargeAreaHighGrayLevelEmphasis, LargeAreaLowGrayLevelEmphasis, LowGrayLevelZoneEmphasis, SizeZoneNonUniformity, SizeZoneNonUniformityNormalized, SmallAreaEmphasis, SmallAreaHighGrayLevelEmphasis, SmallAreaLowGrayLevelEmphasis, ZoneEntropy, ZonePercentage, and Zone-Variance.

The 14 GLDM features were DependenceEntropy, DependenceNonUniformity, DependenceNonUniformityNormalized, DependenceVariance, GrayLevelNonUniformity, GrayLevelVariance, HighGrayLevelEmphasis, LargeDependenceEmphasis, LargeDependenceHighGrayLevelEmphasis, LargeDependenceLowGrayLevelEmphasis, LowGrayLevelEmphasis, SmallDependenceEmphasis, SmallDependenceHighGrayLevelEmphasis, and SmallDependenceLowGrayLevelEmphasis.

To arrive at the forty component models used in the present example, the above-described radiomic features available for each of the training subjects was split into groups based on a combination of two distinctions (i) the source image (and its filtered status), and (ii) the feature generation methodology. The first distinction was fairly straightforward. GLCM features generated from the original, unfiltered images were separated from GLCM features generated from any of the altered/filtered images, such as an image with a log sigma filter applied. Features were extracted from unfiltered images (orig) as well as from the images after applying a variety of filters, including Laplacian of Gaussian (log_sigma), two wavelet (wavelet and wavelet2), logarithm (logarithm), exponential (exponential), and square (square) filters. Further information on these filters can be found in revision 6a761c4e of the pyradiomics documentation, found at the URL pyradiomics.readthedocs.io/en/latest/index.html.

The second distinction separated out the many highly related features generated with a specific methodology from separate groups of features generated with their own methodology. For example, GLCM features were sorted into a separate group from gray level run length matrix (GLRLM) features. Similarly, local binary pattern (LBP) features were separated from Upper local ternary pattern (LTP) and Lower LTP features, all of which were separate from GLCM and GLRLM features. This resulted in 40 separate feature groups, each of which was separately assigned to a logistic regression component model, resulting in the 40 logistic regression component models:

| Component Model Name | Number of features in Component Model |
| --- | --- |
| shape | 49 |
| orig_stats | 54 |
| orig_glcm | 66 |
| orig_glrlm | 48 |
| orig_glszm | 48 |
| orig_gldm | 42 |
| log_sigma_stats | 216 |
| log_sigma_glcm | 264 |
| log_sigma_glrlm | 192 |
| log_sigma_glszm | 192 |
| log_sigma_gldm | 168 |
| wavelet_stats | 378 |
| wavelet_glcm | 462 |
| wavelet_glrlm | 336 |
| wavelet_glszm | 336 |
| wavelet_gldm | 294 |
| wavelet2_stats | 432 |
| wavelet2_glcm | 528 |
| wavelet2_glrlm | 384 |
| wavelet2_glszm | 384 |
| wavelet2_gldm | 336 |
| logarithm_stats | 54 |
| logarithm_glcm | 66 |
| logarithm_glrlm | 48 |
| logarithm_glszm | 48 |
| logarithm_gldm | 42 |
| exponential_stats | 54 |
| exponential_glcm | 66 |
| exponential_glrlm | 48 |
| exponential_glszm | 48 |
| exponential_gldm | 42 |
| square_stats | 54 |
| square_glcm | 66 |
| square_glrlm | 48 |
| square_glszm | 48 |
| square_gldm | 42 |
| Lbp | 84 |
| Upperltp | 84 |
| Lowerltp | 84 |
| Deep | 128 |

The training dataset 404 was subjected to a 5-fold cross validation step (408), in which the training dataset 404 was split into 5 folds and the cross-validation iterated through the folds. At each iteration, one of the 5 folds (representing 20 percent of the cohort randomly selected) was used as the validation set while the remaining 4 folds (representing the remining 80 percent of the cohort) was used as the training set.

During the 5-fold training, information (the measurements and calculations for each of the ~2000 radiomic features) for a particular training subject was inputted into the ensemble model and the label calculated for the particular training subject by the ensemble model was compared to the actual label for the training subject. In this example, the ensemble model consisted of the forty component models. The names of the forty component models are given on the X-axis of FIG. 5A and are the same as the component model names in the table above.

Upon inputting the information (the ~2000 extracted radiomic features) for a particular training subject into the ensemble model, an output from each respective component model in the forty component models was obtained in the form of a corresponding component prediction for the cancer condition of the particular training subject, thereby obtaining forty component predictions for the cancer condition of the training subject. In this example, the information for each particular training subject comprises, for each respective class of radiomics features in a set of forty classes of radiomics features, the corresponding values for each respective radiomic feature in a corresponding plurality of radiomics features of the respective class of radiomics features obtained from a medical imaging dataset for each particular training subject. The imaging medical imaging dataset comprises a plurality of medical images of the tissue in the training subject acquired at a first time using a first medical imaging modality.

In this example, inputting the information for a respective training subject includes (i) inputting the corresponding values for each respective radiomics feature in the corresponding plurality of radiomics features of a first respective class of radiomics features in the forty of classes of radiomics features into a first respective component model in the plurality of component models and (ii) inputting the corresponding values for each respective radiomics feature in the corresponding plurality of radiomics features of a second respective class of radiomics features in the forty of classes of radiomics features into a second respective component model in the plurality of component models, where the corresponding values for no respective radiomics feature in the corresponding plurality of radiomics features of the first respective class of radiomics features is input into the second component model and the corresponding values for no respective radiomics feature in the corresponding plurality of radiomics features of the second respective class of radiomics features is input into the first respective component model. For example, the original gray level co-occurrence matrix (GLCM) features that were inputted into the "orig_glcm" component model were separate and apart from the original gray level run length matrix (GLRLM) features that were inputted into the "orig_glcm" component model.

For each training subject, the forty component predictions were combined to obtain as output of the ensemble model a characterization of the cancer condition. In this example, a simple voting model was used to combine the forty component predictions, and the threshold for determining whether a patient is high or low risk was tuned during training.

Figure 5A:
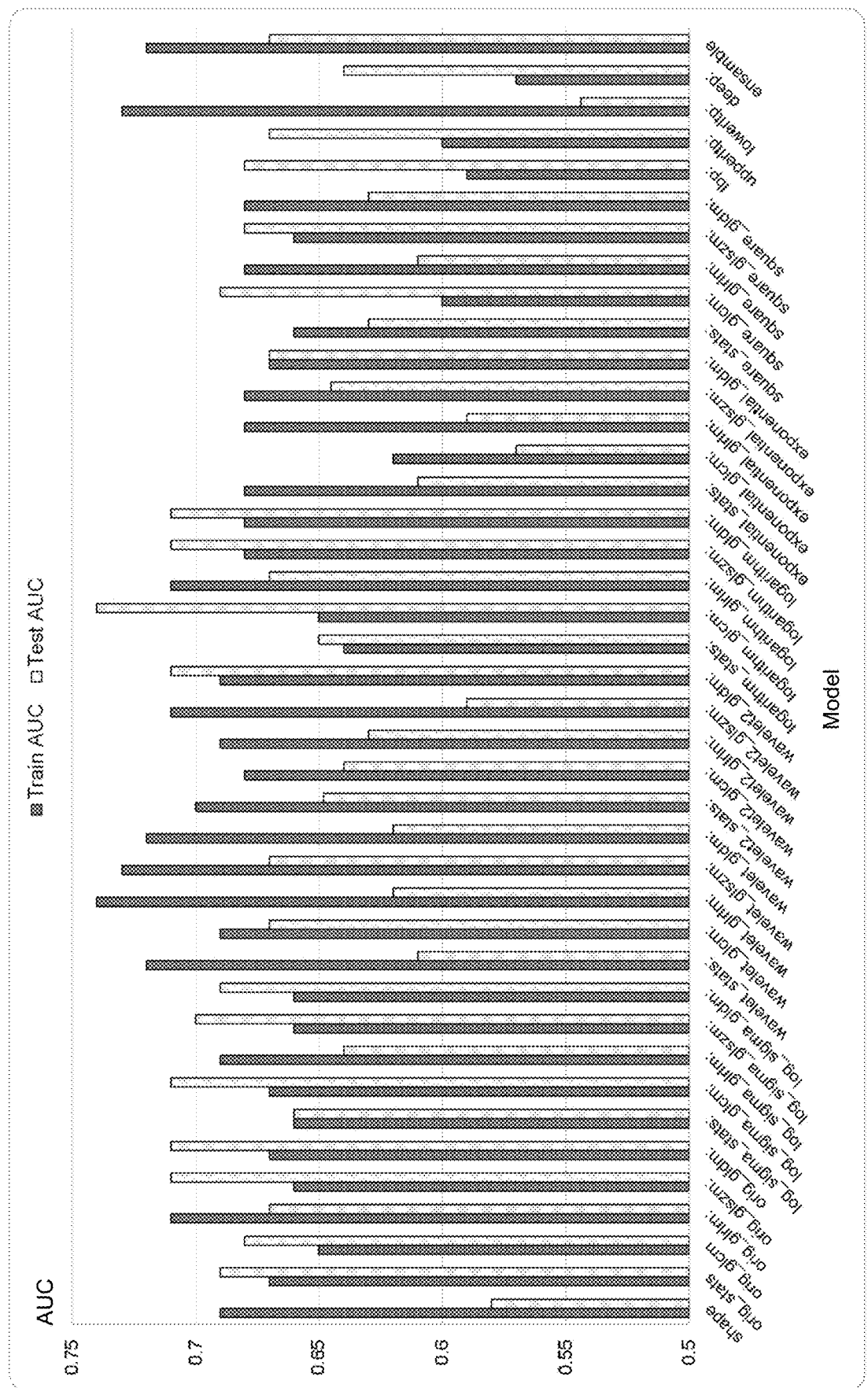
FIGS. 5A, 5B, and 5C collectively illustrate ensemble and component model performance, in accordance with some embodiments of the present disclosure.

Because the model is an ensemble model, it was possible to ascertain the performance of the ensemble model and also ascertain the performance of each of the component models using the cohort of 245 non-small cell lung cancer patients. Towards this end, FIG. 5A shows that nine of the component models have training areas under the curve (AUC) above 0.7, and that the corresponding test AUCs for these nine component models ranged from 0.67 to 0.54. Here, the test AUCs statistics for each component model were from instances where the component model was applied to test subjects in the held out data in the 5-fold training (training subjects that had been assigned to the test dataset in any given fold run; dataset 406 of FIG. 4) whereas the test training AUC is from where the component model was applied to training subjects in the training data in the 5-fold training (dataset 404 of FIG. 4). The difference between the training AUC and the test AUC for a given component model represented a drop in performance. A large drop in performance was indicative of overtraining, since a well trained model should have a similar AUC on both the training (training dataset 404) and the test data (held out test dataset 406).

The last entry on the X-axis of FIG. 5A provides the training and test AUC for the ensemble model, where the forty component models were combined to provide the prediction of absence or presence of non-small cell lung cancer patients in a given training subject (label prediction). The ensemble label prediction matches the best (e.g., least severe) drop in performance exhibited by any of the nine component models having training AUC above 0.7.

Figure 5B:
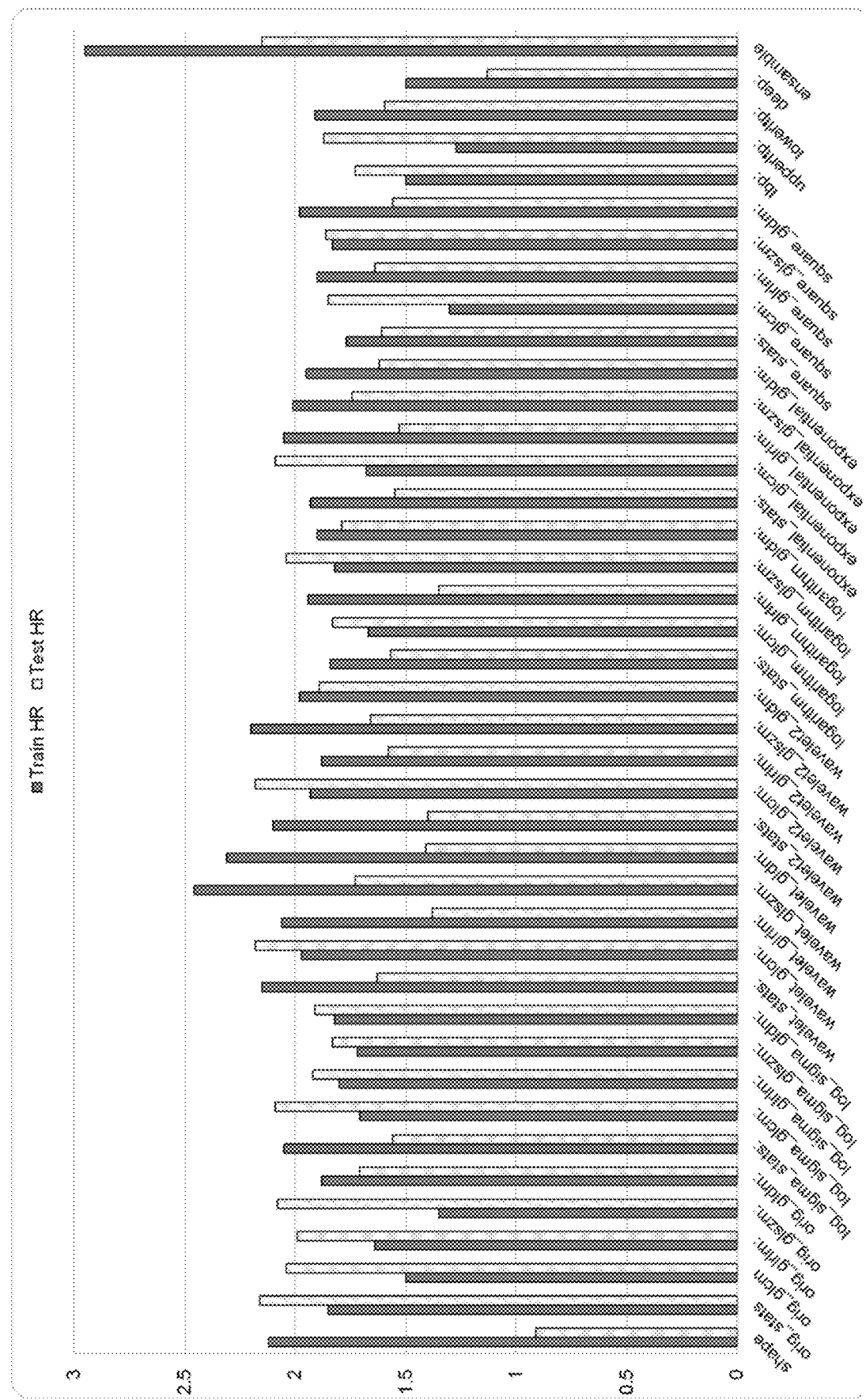

FIG. 5B provides further analysis of the results of the model training using the cohort of 245 non-small cell lung cancer patients. As in FIG. 5A, each component model is listed on the X-axis. In FIG. 5B, the Y-axis is a measure of the hazard ratios for each component model for the cohort. Both the training and the test hazard ratios are given for each component model where, as in FIG. 5A, the training is for the training dataset (404) and the test is for the test dataset of each of the cross validations. The hazard ratio is an estimate of the ratio of the hazard rate in the treated versus the control group. The hazard rate is the probability that if the event in question has not already occurred, it will occur in the next time interval, divided by the length of that interval. FIG. 5B shows that nine component models have hazard ratios (HRs) above 2.0 and their corresponding test HRs range from ~ 1.7 to 0.9. By contrast, the ensemble model (the combination of all forty component models) outperforms all of the training component models, maintaining a HR above 2.0.

Figure 5C:
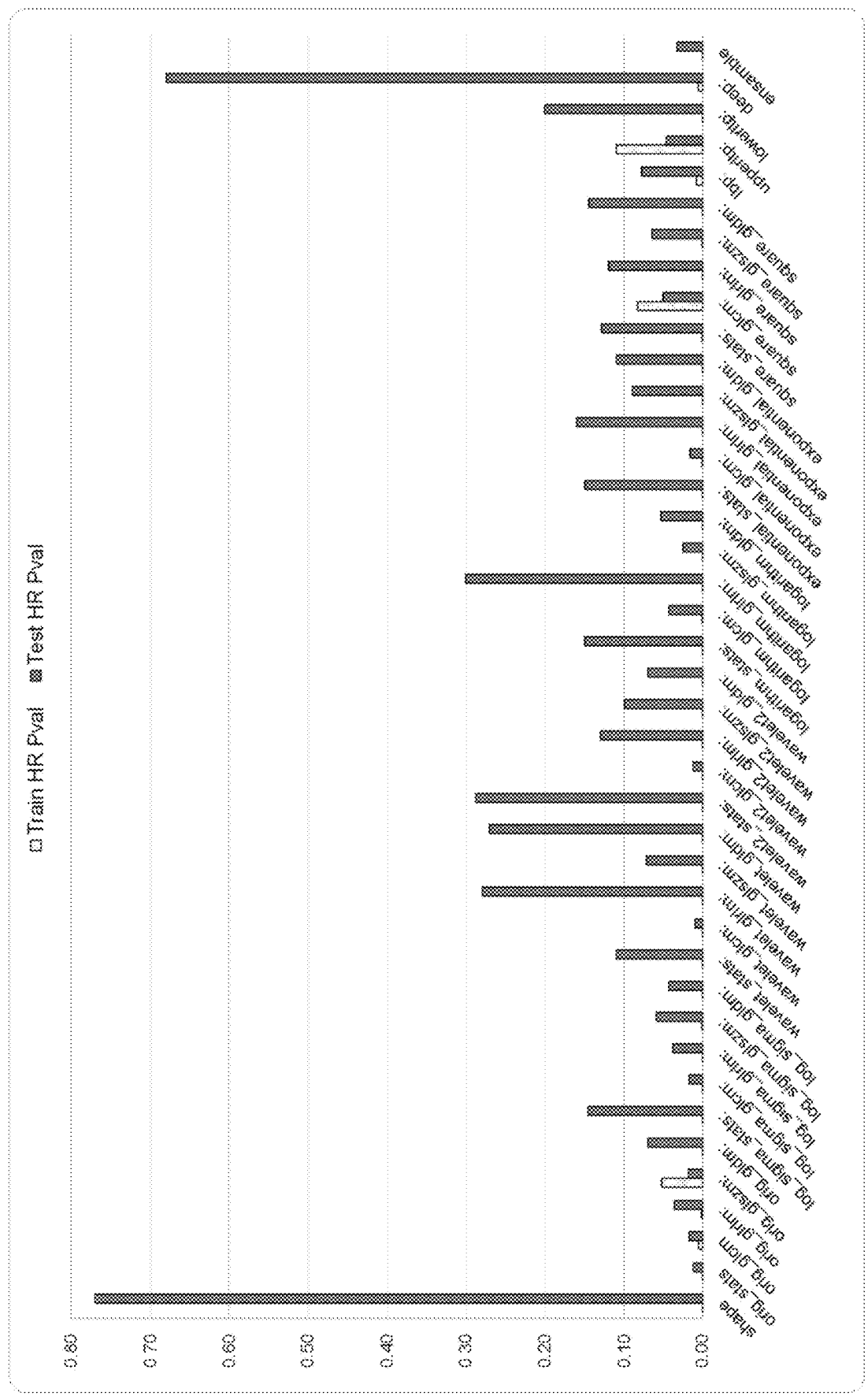

FIG. 5C provides further analysis of the results of the 5-fold model training using the cohort of 245 non-small cell lung cancer patients. As in FIGS. 5A and 5B, each component model is listed on the X-axis. In FIG. 5C, the Y-axis is a measure of the hazard ratio p-value for the HR of each component model for the cohort. The hazard ratio p-value of the HR of a component model is a measure of the statistical significance of the hazard ratio of the component model. FIG. 5C shows that nearly all the component models have significant training HR p-values (based on training dataset 404 of FIG. 4) but only 13 component models maintain significant test (held out dataset 406) HR p-values (e.g., with p-values above 0.1). That is, in FIG. 5C statistical significance arises when the p-value is small. Thus, the presence of large HR p-values for each of the component models against the test data indicates that the HR values determined for these models is not statistically significant. Moreover the 13 models that maintain significant test HR p-value do not necessarily correlate with the most significant, or highest HR training values. By contrast, as seen in the last entry on the X-axis of FIG. 5C, the ensemble model maintains its significance for both the training and the test dataset.

The following table provides component model name (or in the case of the ensemble model, the name "ensemble") and the training AUC, training hazard ratio (HZ), training hazard ratio p-value, test HR, and test HR p-value for each model after training the cohort of 245 non-small cell lung cancer patients through K-fold analysis:

| Model | Train AUC | Train HR | Train HR Pval | Test AUC | Test HR | Test HR Pval |
|---|---|---|---|---|---|---|
| shape | 0.69 | 2.12 | 2.00E−06 | 0.58 | 0.91 | 0.77 |
| orig_stats | 0.67 | 1.85 | 4.90E−05 | 0.69 | 2.16 | 0.012 |
| orig_glcm | 0.65 | 1.5 | 0.005 | 0.68 | 2.04 | 0.017 |
| orig_glrlm: | 0.71 | 1.64 | 0.0013 | 0.67 | 1.99 | 0.036 |
| orig_glszm: | 0.66 | 1.35 | 0.052 | 0.71 | 2.08 | 0.018 |
| orig_gldm: | 0.67 | 1.88 | 5.70E−05 | 0.71 | 1.71 | 0.07 |
| log_sigma_stats: | 0.66 | 2.05 | 8.20E−06 | 0.66 | 1.56 | 0.146 |
| log_sigma_glcm: | 0.67 | 1.71 | 0.0002 | 0.71 | 2.09 | 0.017 |
| log_sigma_glrlm: | 0.69 | 1.8 | 0.0002 | 0.64 | 1.92 | 0.038 |
| log_sigma_glszm: | 0.66 | 1.72 | 0.00067 | 0.7 | 1.83 | 0.059 |
| log_sigma_gldm: | 0.66 | 1.82 | 0.00019 | 0.69 | 1.91 | 0.043 |
| wavelet_stats: | 0.72 | 2.15 | 2.01E−06 | 0.61 | 1.63 | 0.11 |
| wavelet_glcm: | 0.69 | 1.97 | 4.40E−06 | 0.67 | 2.18 | 0.0097 |
| wavelet_glrlm: | 0.74 | 2.06 | 2.70E−06 | 0.62 | 1.38 | 0.279 |
| wavelet_glszm: | 0.73 | 2.46 | 9.30E−08 | 0.67 | 1.73 | 0.072 |
| wavelet_gldm: | 0.72 | 2.31 | 4.39E−07 | 0.62 | 1.41 | 0.27 |
| wavelet2_stats: | 0.7 | 2.1 | 1.13E−05 | 0.648 | 1.4 | 0.287 |
| wavelet2_glcm: | 0.68 | 1.93 | 1.40E−05 | 0.64 | 2.18 | 0.012 |
| wavelet2_glrlm: | 0.69 | 1.88 | 5.67E−05 | 0.63 | 1.58 | 0.13 |
| wavelet2_glszm: | 0.71 | 2.2 | 1.14E−06 | 0.59 | 1.66 | 0.1 |
| wavelet2_gldm: | 0.69 | 1.98 | 3.76E−05 | 0.71 | 1.89 | 0.07 |
| logarithm_stats: | 0.64 | 1.84 | 0.00012 | 0.65 | 1.57 | 0.15 |
| logarithm_glcm: | 0.65 | 1.67 | 0.0005 | 0.74 | 1.83 | 0.043 |
| logarithm_glrlm: | 0.71 | 1.94 | 2.19E−05 | 0.67 | 1.35 | 0.3 |
| logarithm_glszm: | 0.68 | 1.82 | 0.00024 | 0.71 | 2.04 | 0.025 |
| logarithm_gldm: | 0.68 | 1.9 | 2.99E−05 | 0.71 | 1.79 | 0.053 |
| exponential_stats: | 0.68 | 1.93 | 7.26E−05 | 0.61 | 1.55 | 0.15 |
| exponential_glcm: | 0.62 | 1.68 | 0.0004 | 0.57 | 2.09 | 0.016 |
| exponential_glrlm: | 0.68 | 2.05 | 1.00E−05 | 0.59 | 1.53 | 0.16 |
| exponential_glszm: | 0.68 | 2.01 | 5.00E−06 | 0.645 | 1.745 | 0.0897 |
| exponential_gldm: | 0.67 | 1.95 | 2.08E−05 | 0.67 | 1.62 | 0.11 |
| square_stats: | 0.66 | 1.77 | 0.00028 | 0.63 | 1.61 | 0.129 |
| square_glcm: | 0.6 | 1.3 | 0.083 | 0.69 | 1.85 | 0.0504 |
| square_glrlm: | 0.68 | 1.9 | 2.90E−05 | 0.61 | 1.64 | 0.12 |
| square_glszm: | 0.66 | 1.83 | 0.000496 | 0.68 | 1.86 | 0.0646 |
| square_gldm: | 0.68 | 1.98 | 2.22E−05 | 0.63 | 1.56 | 0.145 |
| lbp: | 0.59 | 1.5 | 0.0077 | 0.68 | 1.73 | 0.078 |
| upperltp: | 0.6 | 1.27 | 0.11 | 0.67 | 1.87 | 0.046 |
| lowerltp: | 0.73 | 1.91 | 3.43E−05 | 0.544 | 1.596 | 0.2 |
| deep: | 0.57 | 1.5 | 0.0055 | 0.64 | 1.13 | 0.68 |
| ensemble | 0.72 | 2.95 | 1.69E−07 | 0.67 | 2.15 | 0.0325 |

This example indicates that the ensemble model has substantially better performance than the component models, where each such component model represents a different class of radiomics features. The example also shows that, when testing models, statistical fluctuations can cause inflated performance of some component models or overtraining in some component models, leading to inflated training performance for such component models. By contrast, the ensemble of such component models maintains statistically significant and meaningful predictive power, with a better combination of performance and generalizability than any single component model. This makes the ensemble model a better alternative to selecting a single, possibly overtrained or statistically anomalous single component model.

Plural instances may be provided for components, operations or structures described herein as a single instance. Finally, boundaries between various components, operations, and data stores are somewhat arbitrary, and particular operations are illustrated in the context of specific illustrative configurations. Other forms of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first attribute could be termed a second attribute, and, similarly, a second attribute could be termed a first attribute, without changing the meaning of the description, so long as all occurrences of the "first attribute" are renamed consistently and all occurrences of the "second attribute" are renamed consistently. The first attribute, and the second attribute are both attributes, but they are not the same attribute.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method for characterizing a cancer condition of a tissue in a subject, the method comprising:
    at a computer system that includes one or more processors and memory:
    A) inputting information into an ensemble model comprising a plurality of component models to obtain as output from each respective component model in the plurality of component models a corresponding component prediction for the cancer condition, thereby obtaining a plurality of component predictions for the cancer condition, wherein:
        the information comprises, for each respective class of radiomics features in a plurality of classes of radiomics features, a corresponding value for each respective radiomic feature in a corresponding plurality of radiomics features of the respective class of radiomics features obtained from a medical imaging dataset, wherein the medical imaging dataset comprises a plurality of medical images of the tissue in the subject acquired at a first time using a first medical imaging modality,
        the ensemble model applies a plurality of parameters to the information through a plurality of computations, and
        the inputting includes (i) inputting the corresponding value for each respective radiomics feature in the corresponding plurality of radiomics features of a first respective class of radiomics features in the plurality of classes of radiomics features into a first respective component model in the plurality of component models and (ii) inputting the corresponding value for each respective radiomics feature in the corresponding plurality of radiomics features of a second respective class of radiomics features in the plurality of classes of radiomics features into a second respective component model in the plurality of component models, wherein the corresponding value for no respective radiomics feature in the corresponding plurality of radiomics features of the first respective class of radiomics features is input into the second component model and the corresponding value for no respective radiomics feature in the corresponding plurality of radiomics features of the second respective class of radiomics features is input into the first respective component model; and B) combining the plurality of component predictions to obtain as output of the ensemble model a characterization of the cancer condition.

2. The method of claim 1, wherein the characterization of the cancer condition comprises:
a respective cancer type selected from a plurality of cancer types,
a respective cancer stage selected from a plurality of cancer stages,
a respective tissue of origin selected from a plurality of tissues of origin,
a respective cancer grade selected from a plurality of cancer grades, or
a respective prognosis selected from a plurality of prognoses.

3. The method of claim 1, wherein the cancer condition is a cancer selected from the group consisting of a carcinoma, lymphoma, blastoma, glioblastoma, sarcoma, leukemia, breast cancer, squamous cell cancer, lung cancer, small-cell lung cancer, non-small cell lung cancer (NSCLC), adenocarcinoma of the lung, squamous carcinoma of the lung, head and neck cancer, cancer of the peritoneum, hepatocellular cancer, gastric or stomach cancer, pancreatic cancer, ovarian cancer, cervical cancer, liver cancer, bladder cancer, hepatoma, colon cancer, colorectal cancer, endometrial or uterine carcinoma, salivary gland carcinoma, kidney or renal cancer, liver cancer, prostate cancer, vulval cancer, thyroid cancer, hepatic carcinoma, B-cell lymphoma, low grade/follicular non-Hodgkin's lymphoma (NHL), small lymphocytic (SL) NHL, intermediate grade/follicular NHL, intermediate grade diffuse NHL, high grade immunoblastic NHL, high grade lymphoblastic NHL, high grade small non-cleaved cell NHL, bulky disease NHL, mantle cell lymphoma, AIDS-related lymphoma, Waldenstrom's Macroglobulinemia, chronic lymphocytic leukemia (CLL), acute lymphoblastic leukemia (ALL), hairy cell leukemia, and chronic myeloblastic leukemia.

4. The method of claim 1, wherein the plurality of component models is at least 40 component models.

5. The method of claim 1, wherein a respective component model in the plurality of component models is a neural network, a support vector machine, a Naive Bayes model, a nearest neighbor model, a boosted trees model, a random forests model, or a clustering model.

6. The method of claim 1, wherein each respective component model in the plurality of component models comprises a respective logistic regression model.

7. The method of claim 1, wherein the plurality of classes of radiomics features comprises:
a first subset of classes of radiomics features extracted from an unfiltered version of the plurality of medical images in the medical imaging dataset; and
a second subset of classes of radiomics features extracted from a filtered version of the plurality of medical images in the medical imaging dataset filtered by a first filtering methodology.

8. The method of claim 7, wherein the first filtering methodology comprises an imaging filter selected from the group consisting of a wavelet transform filter, a Laplacian of Gaussian (LoG) filter, a square transform filter, a square root transform filter, a logarithm transform filter, an exponential transform filter, a gradient transform filter, a 2-dimensional local binary pattern filter, and a 3-dimensional local binary pattern filter.

9. The method of claim 7, wherein the first subset of classes of radiomics features comprises at least 5 classes of radiomics features.

10. The method of claim 9, wherein the first subset of classes of radiomics features comprises a class of radiomics features selected from the group consisting of shape features, first order features, gray level cooccurrence matrix (GLCM) features, gray level run length matrix (GLRLM) features, gray level size zone matrix (GLSZM), gray level dependence matrix (GLDM) features, and neighboring gray tone difference matrix (NGTDM) features.

11. The method of claim 9, wherein the first subset of classes of radiomics features comprises shape features, first order features, gray level cooccurrence matrix (GLCM) features, gray level run length matrix (GLRLM) features, gray level size zone matrix (GLSZM), and gray level dependence matrix (GLDM) features.

12. The method of claim 9, wherein each respective class of radiomics features in the first subset of classes of radiomics features comprises at least 10, corresponding radiomics features.

13. The method of claim 7, further comprising, prior to the A) inputting the information into the ensemble model: 1) extracting, for each respective class of radiomics features in the first subset of classes of radiomics features, the corresponding value for each respective radiomic feature in the respective class of radiomics features in the first subset of classes of radiomics features from a region of interest (ROI) or a volume of interest (VOI) in the unfiltered version of the plurality of medical images; and 2) extracting, for each respective class of radiomics features in the second subset of classes of radiomics features, the corresponding value for each respective radiomic feature in the respective class of radiomics features in the second subset of classes of radiomics features from the ROI or the VOI in the filtered version of the plurality of medical images.

14. The method of claim 13, further comprising identifying the ROI or the VOI in the plurality of medical images, wherein identifying the ROI or the VOI in the plurality of medical images comprises:
segmenting the unfiltered version of the plurality of medical images into a plurality of segments or a plurality of volumes;
assigning, to each respective segment in the plurality of segments or to each respective volume in the plurality of volumes, a respective tissue classification in a plurality of tissue classifications based on one or more features of the respective segment or respective volume; and
grouping respective segments in the plurality of segments or respective volumes in the plurality of volumes assigned a target tissue classification in the plurality of tissue classifications, thereby identifying the ROI or the VOI.

15. The method of claim 1, wherein the medical imaging dataset comprises a computerized tomography (CT) dataset, a magnetic resonance imaging (MRI) dataset, an ultrasound dataset, a position emission tomography (PET) dataset, or an X-ray dataset.

16. The method of claim 1, wherein:
the characterization of the cancer condition is a respective characterization selected from a plurality of discrete characterizations of the cancer condition;
each respective component prediction in the plurality of component predictions is a respective component characterization of the cancer condition selected from the plurality of discrete characterizations of the cancer condition; and the B) combining comprises identifying the respective component characterization that is most represented in the plurality of component predictions, thereby obtaining the characterization of the cancer condition.

17. The method of claim 1, wherein:

the characterization of the cancer condition is a respective characterization identified from a continuous range of characterizations of the cancer condition;

each respective component prediction in the plurality of component predictions is a respective component characterization of the cancer condition identified from the continuous range of characterizations; and the B) combining comprises determining a measure of central tendency for the plurality of component predictions, thereby obtaining the characterization of the cancer condition.

18. The method of claim 1, wherein the B) combining comprises inputting the plurality of component predictions for the cancer condition into an aggregation model to obtain as output of the aggregation model the characterization of the cancer condition, wherein the aggregation model is a voting model with a tuned threshold.

19. A computer system, comprising:

one or more processors; and a non-transitory computer-readable medium including computer-executable instructions that, when executed by the one or more processors, cause the processors to perform a method comprising:

A) inputting information into an ensemble model comprising a plurality of component models to obtain as output from each respective component model in the plurality of component models a corresponding component prediction for the cancer condition, thereby obtaining a plurality of component predictions for the cancer condition, wherein:

the information comprises, for each respective class of radiomics features in a plurality of classes of radiomics features, a corresponding value for each respective radiomic feature in a corresponding plurality of radiomics features of the respective class of radiomics features obtained from a medical imaging dataset, wherein the medical imaging dataset comprises a plurality of medical images of the tissue in the subject acquired at a first time using a first medical imaging modality, the ensemble model applies a plurality of parameters to the information through a plurality of computations, and the inputting includes (i) inputting the corresponding value for each respective radiomics feature in the corresponding plurality of radiomics features of a first respective class of radiomics features in the plurality of classes of radiomics features into a first respective component model in the plurality of component models and (ii) inputting the corresponding value for each respective radiomics feature in the corresponding plurality of radiomics features of a second respective class of radiomics features in the plurality of classes of radiomics features into a second respective component model in the plurality of component models, wherein the corresponding value for no respective radiomics feature in the corresponding plurality of radiomics features of the first respective class of radiomics features is input into the second component model and the corresponding value for no respective radiomics feature in the corresponding plurality of radiomics features of the second respective class of radiomics features is input into the first respective component model; and B) combining the plurality of component predictions to obtain as output of the ensemble model a characterization of the cancer condition.

20. A non-transitory computer-readable storage medium having stored thereon program code instructions that, when executed by a processor, cause the processor to perform a method comprising:

A) inputting information into an ensemble model comprising a plurality of component models to obtain as output from each respective component model in the plurality of component models a corresponding component prediction for the cancer condition, thereby obtaining a plurality of component predictions for the cancer condition, wherein:

the information comprises, for each respective class of radiomics features in a plurality of classes of radiomics features, a corresponding value for each respective radiomic feature in a corresponding plurality of radiomics features of the respective class of radiomics features obtained from a medical imaging dataset, wherein the medical imaging dataset comprises a plurality of medical images of the tissue in the subject acquired at a first time using a first medical imaging modality, the ensemble model applies a plurality of parameters to the information through a plurality of computations, and the inputting includes (i) inputting the corresponding value for each respective radiomics feature in the corresponding plurality of radiomics features of a first respective class of radiomics features in the plurality of classes of radiomics features into a first respective component model in the plurality of component models and (ii) inputting the corresponding value for each respective radiomics feature in the corresponding plurality of radiomics features of a second respective class of radiomics features in the plurality of classes of radiomics features into a second respective component model in the plurality of component models, wherein the corresponding value for no respective radiomics feature in the corresponding plurality of radiomics features of the first respective class of radiomics features is input into the second component model and the corresponding value for no respective radiomics feature in the corresponding plurality of radiomics features of the second respective class of radiomics features is input into the first respective component model; and B) combining the plurality of component predictions to obtain as output of the ensemble model a characterization of the cancer condition.

* * * * *